(12) United States Patent
Poppink et al.

(10) Patent No.: US 7,305,381 B1
(45) Date of Patent: Dec. 4, 2007

(54) ASYNCHRONOUS UNCONSCIOUS RETRIEVAL IN A NETWORK OF INFORMATION APPLIANCES

(75) Inventors: Derek E Poppink, Mountain View, CA (US); Jonathan J Hull, San Carlos, CA (US)

(73) Assignee: Ricoh Co., Ltd, Tokyo (JP)

( * ) Notice: Subject to any disclaimer, the term of this patent is extended or adjusted under 35 U.S.C. 154(b) by 240 days.

(21) Appl. No.: 10/046,447

(22) Filed: Oct. 29, 2001

Related U.S. Application Data

(60) Provisional application No. 60/322,518, filed on Sep. 14, 2001.

(51) Int. Cl.
*G06F 7/00* (2006.01)
(52) U.S. Cl. .......................................... 707/3; 707/100
(58) Field of Classification Search ................ 707/1–5, 707/10, 100–102, 200, 104; 715/500.1, 501.1, 715/513, 526, 514, 530; 709/206, 219
See application file for complete search history.

(56) References Cited

U.S. PATENT DOCUMENTS

| | | |
|---|---|---|
| 5,809,167 A | 9/1998 | Al-Hussein |
| 5,826,269 A | 10/1998 | Hussey |
| 5,844,969 A | 12/1998 | Goldman et al. |
| 5,859,971 A | 1/1999 | Bittinger et al. |
| 5,905,777 A | 5/1999 | Foladare et al. |
| 5,911,776 A | 6/1999 | Guck |
| 5,978,837 A | 11/1999 | Foladare et al. |
| 6,160,631 A | 12/2000 | Okimoto et al. |
| 6,173,322 B1 | 1/2001 | Hu |
| 6,236,768 B1 | 5/2001 | Rhodes et al. |
| 6,256,666 B1 | 7/2001 | Singhal |
| 6,327,590 B1 * | 12/2001 | Chidlovskii et al. ........... 707/5 |
| 6,397,228 B1 * | 5/2002 | Lamburt et al. ............ 707/203 |
| 6,449,637 B1 | 9/2002 | Toga |
| 6,487,278 B1 | 11/2002 | Skladman et al. |
| 6,505,237 B2 | 1/2003 | Beyda et al. |
| 6,670,968 B1 | 12/2003 | Schilit et al. |
| 6,697,942 B1 | 2/2004 | L'Heureux et al. |
| 6,714,968 B1 | 3/2004 | Prust |
| 6,741,855 B1 | 5/2004 | Martin et al. |
| 6,801,935 B2 | 10/2004 | Shen |
| 6,859,832 B1 | 2/2005 | Gecht et al. |
| 6,876,462 B2 | 4/2005 | Okada et al. |
| 6,952,724 B2 | 10/2005 | Prust |
| 6,993,527 B1 * | 1/2006 | Raman et al. ............... 707/100 |
| 7,000,001 B2 | 2/2006 | Lazaridis |
| 7,047,242 B1 * | 5/2006 | Ponte .......................... 707/10 |

(Continued)

OTHER PUBLICATIONS

"Autonomy Technology White Paper," Autonomy Systems Ltd., 19 pages, Feb. 2001.

(Continued)

*Primary Examiner*—Wilson Lee
*Assistant Examiner*—Hung Tran Vy
(74) *Attorney, Agent, or Firm*—Fenwick & West LLP

(57) ABSTRACT

A method, system, and computer program product for asynchronous unconscious retrieval retrieves and presents information to end users without requiring the end users to explicitly request the information. The invention automatically and asynchronously formulates queries and presents relevant information to end users within the context of existing applications, so as to minimize the effort, overhead, and context shifts associated with conventional conscious retrieval.

100 Claims, 18 Drawing Sheets

U.S. PATENT DOCUMENTS

| | | | |
|---|---|---|---|
| 7,075,669 | B2 | 7/2006 | Reddy |
| 7,080,099 | B2 | 7/2006 | Tada et al. |
| 7,110,998 | B1* | 9/2006 | Bhandari et al. ............... 707/4 |
| 7,203,725 | B1* | 4/2007 | Gilmour et al. ............ 709/206 |
| 2001/0013029 | A1* | 8/2001 | Gilmour ........................ 707/1 |
| 2001/0042032 | A1 | 11/2001 | Crawshaw et al. |
| 2002/0019851 | A1 | 2/2002 | Pollack |
| 2002/0042838 | A1 | 4/2002 | Tabayoyon et al. |
| 2002/0073076 | A1* | 6/2002 | Xu et al. ........................ 707/3 |
| 2002/0191210 | A1 | 12/2002 | Staas et al. |
| 2002/0194307 | A1 | 12/2002 | Anderson et al. |
| 2003/0028587 | A1 | 2/2003 | Driscoll et al. |
| 2003/0069877 | A1* | 4/2003 | Grefenstette et al. .......... 707/2 |
| 2003/0187951 | A1 | 10/2003 | Shen |
| 2004/0019643 | A1 | 1/2004 | Zirnstein, Jr. |
| 2004/0088318 | A1* | 5/2004 | Brady ........................ 707/102 |
| 2004/0177159 | A1 | 9/2004 | Butterfield et al. |

OTHER PUBLICATIONS

"Discover More: A Technical White Paper on the Stratify Discovery System," Stratify, Inc., v1.1, pp. 1-18, Aug. 2001.

Clarke, I., "A Distributed Decentralised Information Storage and Retrieval System," Division of Informatics, University of Edinburgh, pp. 1-43, 1999, no month.

Poppink, D., "Query Preview, Unplugged!," Ricoh Innovations, Inc., 8 pages, no date, month, year.

Rhodes, B.J., and Maes, P., "Just-in-time Information Retrieval Agents," IBM Systems Journal, vol. 39, Nos. 3&4, p. 685-704, 2000, no month.

Rhodes, B. J., "Just-In-Time Information Retrieval," Program in Media Arts and Sciences, Massachusetts Institute of Technology, pp. 1-133, May 2000.

Projects, Watson [online]. InfoLab [retrieved on Jan. 10, 2002]. Retrieved from the Internet: <URL:http://dent.infolab.nwu.edu/infolab/projects/project.asp?ID=5>. (2 pages), no date, month, year.

Microsoft Office—White Paper: Overview of Smart Tag Technology in Office XP [online]. Microsoft, Inc. [retrieved on Oct. 10, 2001]. Retrieved from the Internet:<URL: http://www.microsoft.com/office/developer/platform/smartag.htm>. (4 pages), no date, month, year.

Microsoft Office & Visual Basic for Application Developer, Interacting with Smart Tags, The SmartTags Collection and SmartTag Object [online]. Microsoft, Inc. [retrieved on Oct. 2, 2001]. Retrieved from the Internet: <URL: http://msdn.microsoft.com/library/en-us/dnovba01/html/interactingwithsmarttags.asp?frame>. (10 pages), no date, month, year.

Almaden Computer Science Research, BlueEyes Suitor [online]. IBM [retrieved on Jan. 10, 2002]. Retrieved from the Internet: <URL: http://www.almaden.ibm.com/cs/blueeyes/suitor.html>. (1 page), no date, month, year.

RichLink Technology: How RichLink Works [online]. Sentius Corporation 1993-2001 [retrieved on Jan. 10, 2002]. Retrieved from the Internet: <URL: http://www.sentius.com/RL/english/solutions/c_30301.html>. (2 pages).

Marsan, C. D., "Printing to get 'Net Facelift," [online]. NetworkWorldFusion, Jul. 10, 2000 [retrieved on Sep. 19, 2002]. 4 Pages. Retrieved from the Internet: <URL: http://www.nwfusion.com/cgi-bin/mailto/x.cgi>.

PrintMe Networks web pages [online]. PrintMe Networks [retrieved on Sep. 19, 2002]. 18 Pages. Retrieved from the Internet: <URL: https://www.printme.com/>, no day, month, year.

Wood, D., "Programming Internet Email," Sebastopol, CA, O'Reilly and Associates, 1999, pp. 38-40 and 46-57.

* cited by examiner

| | Monday | Tuesday | Wednesday | Thursday | Friday | |
|---|---|---|---|---|---|---|
| | January 29 | 30 | 31 | February 1 | 2 | |
| | 7:30am Meet Scott | 12:00pm Ricoh praye | 7:30am Intern class | | 8:30am Send out pr. | |
| | 11:15am Ricoh mtg | 7:00-8:20pm LTG | | | 10:00am DA mtg | |
| | | | | | 12:00pm Frisbee | |
| | 5 | 6 | 7 | | | |
| | Review mtg | 12:00pm Ricoh praye | 7:30am Intern class | A new structure for news editing | | |
| | 7:30am Meet Scott | 2:00pm Daja talk | | | | |
| | 11:15am Ricoh mtg | 7:00pm LTG | | | | |
| | 12 | 13 | 14 | | | |
| | 7:30am Meet Scott | 10:00am Greg talk | 7:30am Intern class | *Ideally a computation in appropriately in count update in the intramural-internature treat associated with selecting and presenting timely, recurrent inter-animation i.e., perra editing. At present the goal is difficult to attain because of the plausibility* | | |
| | 11:15am Ricoh mtg | 12:00pm Ricoh praye | 12:00pm Pizza for Ric | | | |
| | | 3:45pm Multimedia v | | | | |
| | | 7:00pm LTG | | | | |

| | A | B | C | D |
|---|---|---|---|---|
| 1 | | | | |
| 2 | | Customer List | | |
| 3 | | Ana Trujillo | | |
| 4 | | Ana Trujillo Emparedad (425) 555-0151 | | |
| 5 | | | | |
| 6 | | | | |
| 7 | | | | |
| 8 | | | | |
| 9 | | | | |
| 10 | | | | |
| 11 | | | | |
| 12 | | | | |
| 13 | | | | |

ASYNCHRONOUS UNCONSCIOUS RETRIEVAL IN A NETWORK OF INFORMATION APPLIANCES

CROSS-REFERENCE TO RELATED APPLICATIONS

The present application claims priority from provisional U.S. Patent Application Ser. No. 60/322,518 for "Asynchronous Unconscious Retrieval in a Network of Information Appliances," filed Sep. 14, 2001, the disclosure of which is incorporated herein by reference.

BACKGROUND OF THE INVENTION

1. Field of the Invention

The present invention is related to automated information retrieval, and more particularly to systems, methods, and computer program products for asynchronously retrieving relevant information from a number of sources and presenting the retrieved information to an end user in a manner that avoids the need for conscious effort by the end user.

2. Description of the Background Art

Modern office appliances, including computers, photocopiers, digital cameras, meeting recorders, personal digital assistants, visitor kiosks, printers, and the like, are capturing increasing amounts of digital information. This information includes, for example, office communications (such as e-mails, voicemails, and faxes) and other corporate knowledge (documents, presentations, visitor records, meetings, reports, spreadsheets, videos, and the like). Such information is often stored in a distributed fashion among many different devices and at many different locations. In addition, related information on various topics may be available from other sources such as the World Wide Web, publicly available databases, and the like. In general, some subset of such information is available to users via conscious retrieval methods, such as by browsing file structures and hyperlinks, navigating through file systems, searching by keyword, scrolling, and the like.

Conscious retrieval methods suffer from several limitations. The first is information overload: the sheer volume of digital data available makes it difficult for users to locate a particular desired piece of information. In many instances, information available on the World Wide Web may be particularly difficult to locate because of the unstructured and open-ended nature of the medium.

A second limitation is source overload: the large number of information sources often requires a user to search in several different places, often using different search mechanisms which must each be performed consciously. For example, information concerning a particular person may be available from a variety of sources, including an address book or contact list, a directory available on the World Wide Web, a company database, and the like. Conventionally, conscious searches would have to be performed on each of these information sources separately, and in many cases such searches would have to be formulated in different ways according to the particular characteristics of each of the information sources.

A third limitation is a lack of awareness of available information: a user may simply be unaware that a piece of relevant and useful information is available. This problem is particularly evident when large amounts of information are available in a distributed format or without a central organization or collection scheme. For example, information may be available on a relatively obscure website, or on a remotely located information appliance of which the end user is unaware. The information may have been collected by another user and stored on the other user's machine rather than in public data storage. Or the information may have been collected by an information appliance, such as a photocopier, that automatically retains copies of digital information, and the end user may not be aware that such retention has taken place with respect to a relevant piece of data. Finally, the end user may simply have forgotten that a piece of information exists, even though he or she may have previously been aware of its existence.

A fourth limitation is the overhead associated with retrieving information consciously: the user must often change contexts in order to initiate a search, and furthermore must spend some time formulating searches (as well as acquiring the expertise to formulate an effective search). Thus, conscious retrieval often presents significant barriers, which consume valuable time and which may engender cognitive interruptions that limit the user's overall productivity.

One example of the type of information whose retrieval is subject to the above limitations is information about people. In a typical office environment, contact information and other descriptive information about people are often stored in many different locations. Such information may be stored in information appliances (which may include records of telephone calls, e-mails, records of meetings, and the like), contact lists, databases, and the like. Since the information is highly distributed among several storage facilities, the above-described limitations are particularly pertinent.

Existing techniques of automatic retrieval rely primarily on text-matching algorithms to determine relevancy, along with some knowledge of user actions. Some existing systems employ pattern matching.

Remembrance Agent, developed at Massachusetts Institute of Technology (MIT) Media Lab, uses the content of a document to recommend related files on the user's file system. The user's context, including location and activity, may also be taken into account. The system presents a list of documents related to the user's current document. The list is continually updated as the user inputs text, navigates through e-mails, or otherwise changes the on-screen view.

Margin Notes, also developed at MIT Media Lab, uses the content of a web page being viewed in a web browser to recommend related files on a user's file system. The system compares sections of the web page to pre-indexed document stores, based on keyword co-occurrence. Relevant documents are presented to the end user via margin annotations adjacent to the appropriate section of the web page.

Remembrance Agent and Margin Notes are both further described in B. J. Rhodes & P. Maes, "Just-In-Time Information Retrieval Agents," in *IBM Systems Journal*, vol. 39, nos. 3 & 4, pp. 685-704 (2000), and B. J. Rhodes, "Just-In-Time Information Retrieval," (Ph.D. dissertation, Massachusetts Institute of Technology, 2000). Further description of Remembrance Agent is provided in U.S. Pat. No. 6,236,768 to Rhodes et al., "Method and Apparatus for Automated, Context-Dependent Retrieval of Information," issued on May 22, 2001.

Watson, developed at Northwestern University Infolab, and described at http://dent.infolab.nwu.edu/infolab/projects/project.asp?ID=5, directs queries to external search engines based on the content of a document being composed or viewed by a user, together with a model of user actions. Watson profiles the user, monitors behavior, and searches for relevant information.

Simple User Interest Tracker (SUITOR), developed at the IBM Almaden Research Center, and described at www.almaden.ibm.com/cs/blueeyes/suitor.html, uses the content of active documents together with a gaze-tracking system to suggest relevant documents from personal and company-wide repositories. Suitor monitors the user's activities, infers what sorts of information that will likely be most interesting at a given moment, and then delivers that information to the user. For example, by monitoring the user's web browsing activity, Suitor can find additional information on topics related to the currently viewed page.

Kenjin, available from Autonomy Systems Ltd. of San Francisco, Calif., and described at www.autonomy.com, automatically delivers links to related information relevant to a document or web page currently open in the user's browser, e-mail client, or application.

Yogi Internet Discovery System, available from PurpleYogi, Inc. of Mountain View, Calif., and described at www.purpleyogi.com, suggests relevant materials from an indexed selection, using personal profiles and a topic classification system.

Active Knowledge, available from Autonomy Systems Ltd. of San Francisco, Calif., and described at www.autonomy.com, uses text pattern recognition software to categorize documents in distributed locations and to dynamically add hyperlinks.

Flyswat, available from Flyswat of San Francisco, Calif., and described at www.flyswat.com, automatically highlights words and phrases within web pages being viewed by a user. Users can click a highlighted item to see a window containing a list of links to additional information about the item.

RichLink, available from Sentius Corporation of Palo Alto, Calif. and described at www.sentius.com/RichLink/english/index.html, automatically adds contextual content to web pages. The content is presented to a user upon the user's request. Third parties can install the RichLink software and provide databases to be used for retrieval of contextual content.

Although the above-referenced prior art systems provide various types of automated information retrieval, they are, in general, only able to retrieve and provide relevant information in a synchronous, real-time mode. Queries are formulated and executed on databases or other storage mechanisms that are available at the time the user is viewing the related document; thus such schemes are generally incapable of retrieving related information that may not be available at the moment the user would find it useful or at the time a search is run. In addition, such prior art schemes are generally unable to obtain related data from other user's computers or from a network of information appliances, but rather are limited to information retrieval from servers or other centrally located sources.

What is needed is a system and method for retrieving and presenting relevant information asynchronously, automatically, and in the context of an end user's activities, so as to avoid the limitations and burdens associated with conscious retrieval. What is further needed is a system and method that performs the retrieval and presentation operations while avoiding the limitations of the prior art. What is further needed is a system and method of automatically retrieving and presenting relevant information to an end user with a minimum of user effort. What is further needed is a system and method of automatically and asynchronously retrieving and presenting relevant information that is stored on other users' computers.

SUMMARY OF THE INVENTION

The present invention automatically and asynchronously retrieves and presents information to end users without requiring the end users to explicitly request the information. The invention presents relevant information to end users within the context of existing applications, so as to minimize the effort, overhead, and context shifts associated with conventional conscious retrieval. Furthermore, the present invention automatically retrieves relevant information even when the user is not aware of the existence or source of the information.

The invention formulates and executes queries to retrieve information in an asynchronous manner. Asynchronous retrieval is a technique whereby an information item is provided independently of a specific request by the user; upon receipt of the item, it can be stored locally at the recipient, so that it may be viewed at any time thereafter. Asynchronous retrieval does not require that the connection with the information source be active at the time the information is viewed by the user. The invention pre-fetches results when they are available and caches them so that they may later be displayed for the user. For example, the invention may formulate and execute a query based on an e-mail message when the message is received at an e-mail server or at a user's machine, even though the user is not currently logged on. If result items are received prior to the user viewing the e-mail message, the result items are cached so that they can be presented to the user when he or she views the message. Thus, the result items may be displayed even if the source of the result items is not available or disconnected at the time the user is actually viewing the e-mail message.

In one aspect, the present invention operates in the context of a network of information appliances. Thus, the end users may be interacting with a computer on a network, and information may be automatically retrieved from one or more information appliances connected to the computer via the network. Based on an end user's context in a given application, the invention issues one or more queries to one or more information appliances. Responses received from the queried information appliances are evaluated so as to determine their relative relevance. Responses that are determined to be relevant are processed as needed and displayed to the end user.

In another aspect, the present invention formulates model-based and field-based structured queries that take into account the context of various query keywords. Queries may be directed to particular data resources on the category of information represented by the query key. Queries may be augmented with additional information retrieved from information appliances (or other sources).

In another aspect, the present invention queries a number of information resources, and may obtain information from other users' computers in addition to or instead of from centrally located resources. Information for retrieval by the present invention may be cached in multiple locations so that it may be retrieved from whichever location is most convenient, reliable, or quickest to respond. Information may be stored in (and retrieved from) information appliances, such as visitor kiosks and document management devices.

In another aspect, the invention performs multi-stage queries, making inferences from a first set of result items as to likely additional sources of information which are then queried using the original query terms and/or terms derived from the first set of result items. For example, if a visitor's information is available from a visitor kiosk based on a visit on a particular day, an inference may be made that the visitor may have attended a meeting on that day. The invention may then search a meeting recorder or presentation recorder to determine if any records of meetings are available for the given day.

The present invention thus takes the form of an automated process having access to a network of information appliances and a semantic understanding of the information needs of the end user. The invention formulates and transmits queries to information appliances and other devices, stores knowledge about the relationships between individuals and data, evaluates results so as to determine which information would be most useful to a given end user at a given time, and presents the results in the context of an application so as to minimize overhead and context-switching.

The invention is able to present relevant information automatically, without requiring the user to initiate the information retrieval or presentation operations. Information may be presented to the user within the context of the application the user is currently running, so as to avoid the need for a distracting context switch, and so as to improve the likelihood that the information is presented in a manner that is of use to the user. In another aspect, the present invention varies the presentation of a retrieved item, depending on the source of the data item, its category, and its estimated relevance. For example, knowledge of the particular source of the retrieved data may be used to determine relevance, likely accuracy, reliability, and timeliness of the data. The invention may therefore present the retrieved data in a manner that indicates the estimated relevance of the data and may, for example, rank the data in relation to other retrieved data. In addition, the invention takes into account the history of the user's interaction with the result item, so that newly presented items may be given priority over items the user has already seen.

In another aspect, the invention presents relevant information in a dynamic query interface or query preview interface, which combines functionality for constructing queries with a display of query results. Such an interface may be presented automatically, or in response to a user clicking a link or otherwise indicating that he or she is interested in obtaining more information related to a particular item.

One application of the present invention is to use the unconscious information retrieval techniques in the context of a network of shared information appliances to build and access a dynamic directory of information about people. By providing unconscious retrieval techniques in this manner, the present invention allows users to share and retrieve useful, non-invasive information about others, and thereby better remember their own interactions with others, gather public information about individuals, and facilitate networking by identifying intermediaries.

By automatically and asynchronously retrieving and presenting information in this manner, the present invention avoids the limitations of the prior art, and in particular allows users to avoid spending time on potentially unproductive conscious searches. Information can be retrieved and presented to the user with no effort on the user's part. Furthermore, the present invention enables automated sharing of information among users and appliances, so as to improve accuracy and timeliness of retrieved information. The invention may be implemented using asynchronous queries, so as to conduct the information retrieval operations with minimal disruption of ongoing network operations, and so as to enable operation of the invention even when continuous network connections are not available.

BRIEF DESCRIPTION OF THE DRAWINGS

FIG. 3 is an example of a user interface for displaying information to an end user in the context of a calendar interface, according to one embodiment of the present invention.

FIGS. 13A and 13B depict an example of a user interface for displaying information to an end user via a "smart tag."

Figure 1:
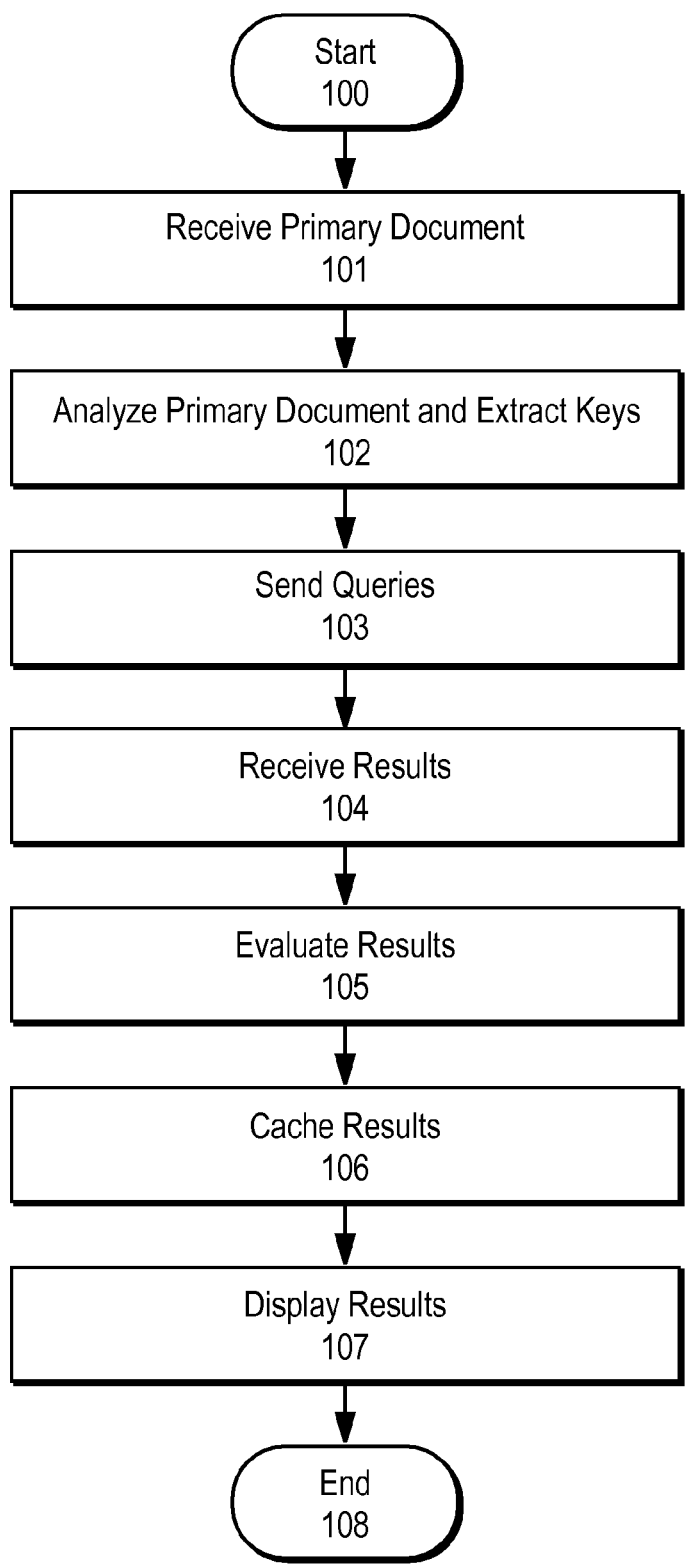
FIG. 1 is a flow chart depicting a method of unconscious retrieval according to one embodiment of the present invention.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Moreover, the present invention claimed below is operating on or working in conjunction with an information system. Such an information system as claimed may be the entire workflow system as detailed below in the preferred embodiment or only portions of such a system. For example, the present invention can operate with an information system that need only be a browser in the simplest sense to present and display objects. Thus, the present invention is capable of operating with any information system from those with minimal functionality to those providing all the functionality disclosed herein.

The present invention employs the terms "synchronous" and "asynchronous" to refer to a mode of information retrieval. Synchronous retrieval is a technique whereby an information item is provided in response to a request; accordingly, such retrieval generally requires that the information item be available and the transmission medium active so that the item can be retrieved at the appropriate time. Asynchronous retrieval is a technique whereby an information item is provided independently of a specific request by the user; upon receipt of the item, it can be stored locally at the recipient, so that it may be viewed at any time thereafter. Asynchronous retrieval does not require that the connection with the information source be active at the time the information is viewed by the user. One technique of implementing asynchronous retrieval is set forth in D. Poppink, "Query Preview, Unplugged!" (2001), the disclosure of which is incorporated herein by reference.

System

Figure 12:
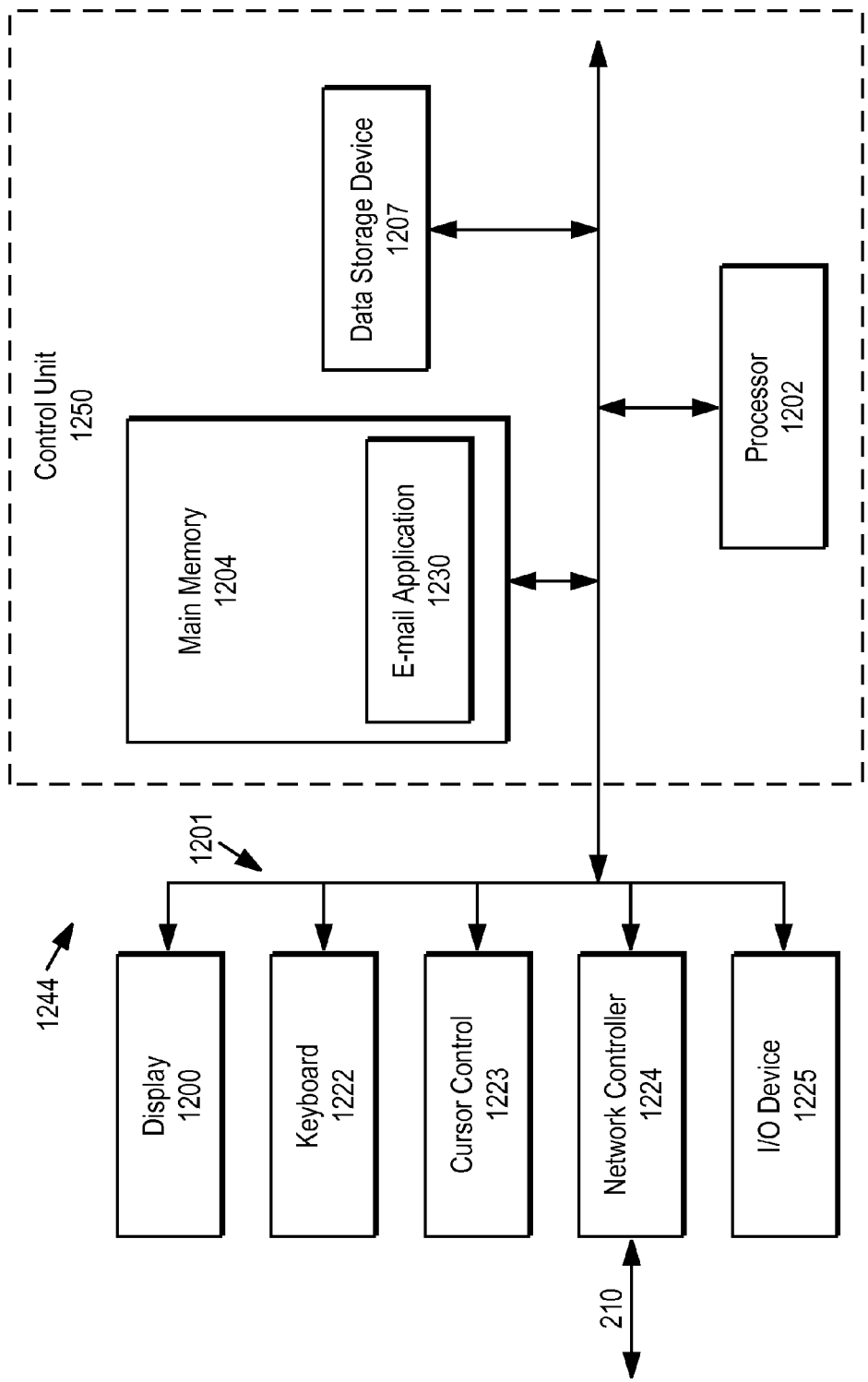
FIG. 12 is a block diagram of a system for practicing the present invention according to one embodiment.

Referring now to FIG. 12, there is shown a preferred embodiment for a system according to the present invention, as implemented on a client-computing device 1244. The client-computing device 1244 comprises a control unit 1250 coupled to a display device 1200, a keyboard 1222, a cursor controller 1223, a network controller 1224 and an I/O device 1225 by a bus 1201.

Control unit 1250 may comprise an arithmetic logic unit, a microprocessor, a general purpose computer, a personal digital assistant or some other information appliance equipped to provide electronic display signals to display device 1200. In one embodiment, control unit 1250 comprises a general purpose computer having a graphical user interface, which may be generated by, for example, a program or application running on top of an operating system such as WINDOWS® or UNIX®. In one embodiment, one or more application programs executed by control unit 1250 include, without limitation, database applications, word processing applications, electronic mail applications, spreadsheet applications, and web browser applications. The control unit 1250 also has other conventional connections to other systems such as a network for distribution of files (media objects) using standard network protocols such as TCP/IP, HTTP, and SMTP as will be understood to those skilled in the art and shown in detail in FIG. 12.

As shown in FIG. 12, control unit 1250 includes a processor 1202, main memory 1204, and data storage device 1207, all of which are communicatively coupled to system bus 1201.

Processor 1202 processes data signals and may comprise various computing architectures including a complex instruction set computer (CISC) architecture, a reduced instruction set computer (RISC) architecture, or an architecture implementing a combination of instruction sets. Although only a single processor is shown in FIG. 12, multiple processors may be included.

Main memory 1204 may store instructions and/or data that may be executed by processor 1202. The instructions and/or data may comprise code for performing any and/or all of the techniques described herein. Main memory 1204 may be a dynamic random access memory (DRAM) device, a static random access memory (SRAM) device, or some other memory device known in the art. The main memory 1204 preferably includes an e-mail application 1230 of a conventional type that provides functionality for sending, receiving, composing, and viewing e-mails. In alternative embodiments, other applications may be provided instead of or in addition to e-mail application 1230.

Data storage device 1207 stores data and instructions for processor 1202 and may comprise one or more devices including a hard disk drive, a floppy disk drive, a CD-ROM device, a DVD-ROM device, a DVD-RAM device, a DVD-RW device, a flash memory device, or some other mass storage device known in the art.

System bus 1201 represents a shared bus for communicating information and data throughout control unit 1250. System bus 1201 may represent one or more buses including an industry standard architecture (ISA) bus, a peripheral component interconnect (PCI) bus, a universal serial bus (USB), or some other bus known in the art to provide similar functionality.

Additional components coupled to control unit 1250 through system bus 1201 include display device 1200, keyboard 1222, cursor control device 1223, network controller 1224 and I/O device 1225. Display device 1200 represents any device equipped to display electronic images and data as described herein. Display device 1200 may be a cathode ray tube (CRT), liquid crystal display (LCD), or any other similarly equipped display device, screen, or monitor.

Keyboard 1222 represents an alphanumeric input device coupled to control unit 1250 to communicate information and command selections to processor 1202. Cursor control 1223 represents a user input device equipped to communicate positional data as well as command selections to processor 1202. Cursor control 1223 may include a mouse, a trackball, a stylus, a pen, a touch screen, cursor direction keys, or other mechanisms to cause movement of a cursor. Network controller 1224 links control unit 1250 to a network that may include multiple processing systems. The network of processing systems may comprise a local area network (LAN), a wide area network (WAN) (e.g., the Internet), and/or any other interconnected data path across which multiple devices may communicate.

One or more I/O devices 1225 are coupled to the system bus 1201. For example, the I/O device 1225 may be an audio device equipped to receive audio input and transmit audio output.

It should be apparent to one skilled in the art that control unit 1250 may include more or less components than those shown in FIG. 12 without departing from the spirit and scope of the present invention. For example, control unit 1250 may include additional memory, such as, for example, a first or second level cache, or one or more application specific integrated circuits (ASICs). Similarly, additional components may be coupled to control unit 1250 including, for example, image scanning devices, digital still or video cameras, or other devices that may or may not be equipped to capture and/or download electronic data to control unit 1250.

Method of Operation

Referring now to FIG. 1, there is shown a flow chart depicting a method of unconscious retrieval according to one embodiment of the present invention. Specifically, FIG. 1 depicts an embodiment of the invention implemented in the context of an e-mail application. For example, the invention could be implemented as a plug-in or as a bundled feature in a commercial e-mail application such as Microsoft Outlook, which receives e-mail from senders and presents the received e-mail to an end user. One skilled in the art will recognize that this particular implementation and mode of operation is merely exemplary, and that the present invention can be implemented in any context or application, and in connection with any type of document or information item.

The invention receives 101 a document, such as an e-mail message or other document, according to techniques known in the art. This document is herein referred to as the "primary document." For example, an e-mail message may be received at an e-mail server, where it is temporarily stored until the user logs on to retrieve messages. Alternatively, the message may be received at the user's machine or at some other location.

The invention then analyzes 102 the contents of the primary document, including headers, body, sender information, attachments, and any combination thereof, in order to identify and extract key words, phrases, names and the like.

In one embodiment, the invention extracts keys using known techniques for applying semantic knowledge to ascertain the nature and relevance of particular items in the primary document. For example, the positioning of an item within the text of a message, its format (e.g. an e-mail addressing format), surrounding tags (such as XML tags), and the like can be indicative of its overall relevance. In one embodiment, the invention employs "part-of-speech" tagging for analyzing document contents, extracting and categorizing query keys, and determining likely sources to query for information; as is known in the art, such techniques are used for parsing text and other data in order to formulate fielded queries. One example of a "part-of-speech" tagging system is Constituent Likelihood Automatic Word-tagging System (CLAWS), developed by the University Centre For Computer Corpus Research On Language, at Lancaster University, Lancaster, United Kingdom. CLAWS is described in Garside, R., and Smith, N., "A hybrid grammatical tagger: CLAWS4," in Garside, R., Leech, G., and McEnery, A. (eds.) *Corpus Annotation: Linguistic Information from Computer Text Corpora*, Longman, London (1997), pp. 102-121. Additional description is provided at http://www.comp.lancs.ac.uk/ucrel/claws. Where more than one key is extracted from the primary document, they may be ranked so that results relating to one key are considered more important, and therefore will be displayed more prominently, than results relating to another key.

Using the extracted keys, together with any additional related data items collected from other data sources, the invention formulates and sends 103 queries in order to obtain relevant information concerning the subject matter or sender of the e-mail message. Queries may be sent to any available information source, including for example information appliances, document management devices such as eCabinet from Ricoh Silicon Valley, Inc., hard drives, kiosks, document storage, websites, shared information available on peer computers, and the like. Information sources may be local, or may be remotely located and accessible via a network. Queries may be sent in any desired format and using any desired protocol, such as for example Transmission Control Protocol/Internet Protocol (TCP/IP), Hypertext Transfer Protocol (HTTP), e-mail, and the like. Since, in many office environments, a large number of computers are connected via a local area network (LAN) as well as to the Internet, queries may be sent to other computers within the user's company, or to other computers or servers connected to the Internet.

In one embodiment, the invention determines which information source or sources to query, based on the nature and context of the query terms within the primary document, and further based on overall characteristics of the primary document itself. For example, when query terms include the names of individuals, the invention might query a visitor kiosk, an online directory, and the like; on the other hand, when query terms include the names of businesses, the invention might query a listing of business websites. In another embodiment, queries are transmitted to all known information appliances, computers, and other potential sources of data, so that any source that receives the query can respond with query results if available.

The invention receives 104 results containing relevant information responsive to the queries. Results may be received in any desired format and using any desired protocol, such as for example TCP/IP, HTTP, e-mail, and the like. In one embodiment, such results are received over the same network as was used for transmitting the queries in step 103. Thus, information may be received from other computers within the user's company, or from other computers or servers connected to the Internet. In one embodiment, results are cached in a local database (not shown), along with local copies of icons to represent people, documents, maps, and the like.

In one embodiment, the invention performs a multi-stage query. Items from a first set of results, as received in 104, are used in formulating additional searches to obtain additional search results. For example, a person's name may be extracted from a received e-mail and utilized in forming an initial query. Results received in response to the initial query, such as the name of the person's employer (as provided by a contact list or address book, or from a company directory), can be used to formulate a subsequent query of additional information appliances. The subsequent query may then be executed, either alone or in conjunction with elements of the initial query, so as to provide more robust results. This multi-stage, or "cascading," query technique may be repeated as many times as is appropriate in order to take advantage of multiple sources of data as may be available in different formats, structured in different ways, and stored at different locations in the network.

Figure 10:
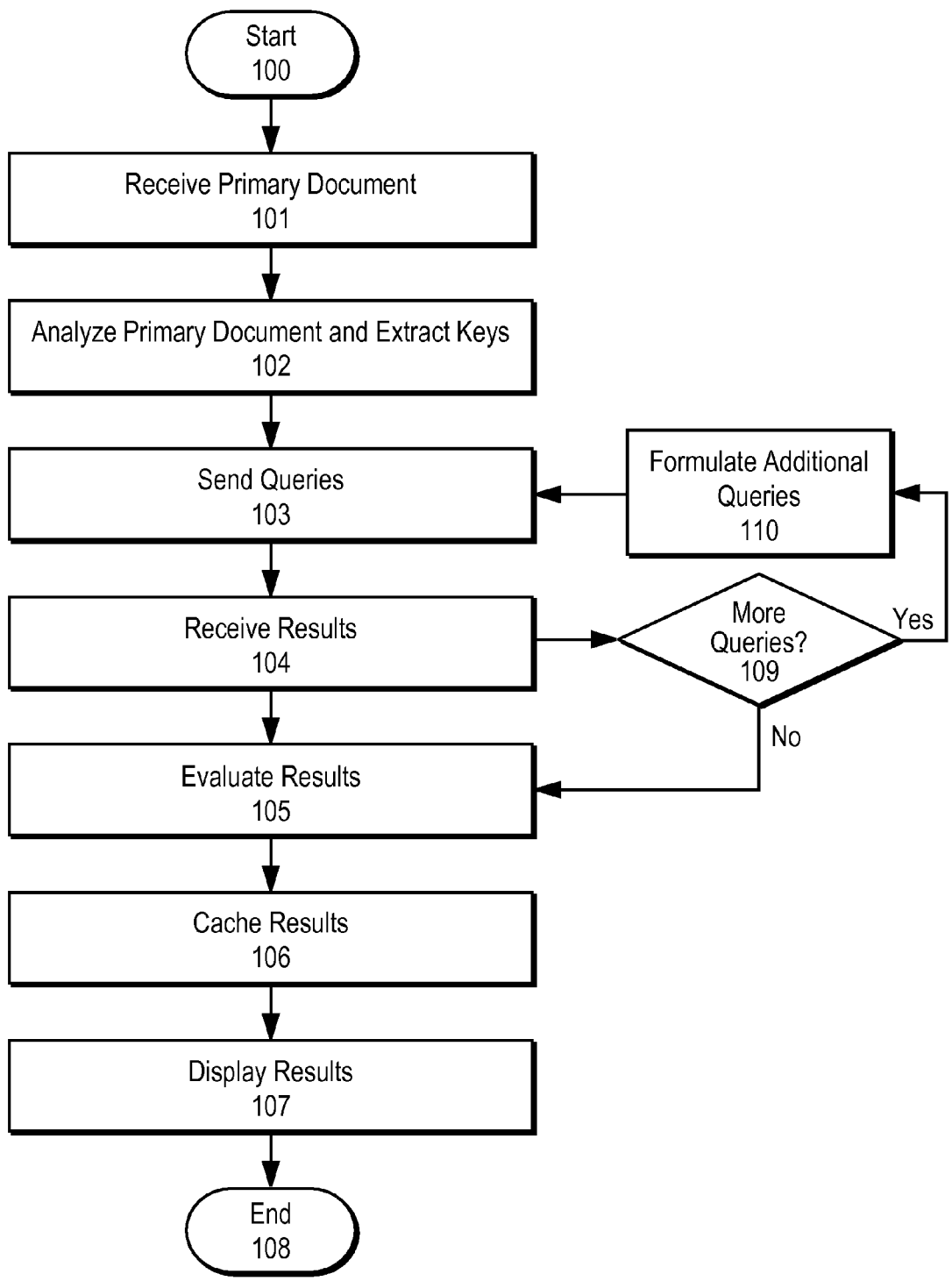
FIG. 10 is a flow chart depicting a method of multi-stage querying according to one embodiment of the present invention.

Referring momentarily to FIG. 10, there is shown a flowchart depicting a method of unconscious retrieval including multi-stage querying. After receiving results 104, the invention determines 109 whether more queries are appropriate. The decision as to whether to perform additional queries may depend upon whether a predetermined number of results have been received, or whether additional information sources are available, or on some assessment of the quality of received results, or on any other condition or combination of conditions. In one embodiment, the invention employs "part-of-speech" tagging, as described above, for analyzing query results and determining likely sources to query for additional information.

If additional queries are to be performed, the invention formulates 110 the additional queries based on results received in 104 and/or original query keys, and steps 103 and 104 are repeated.

Referring again to FIG. 1, the invention then evaluates 105 the received results so as to identify the most relevant information for presentation to the user. Evaluation of received results may be performed according to known techniques of applying semantic knowledge, and takes into account, for example, the context of the query, the nature of the end user's current interaction with the primary document, the nature of the retrieved information, the types of information appliances that have provided results, and the context of the results. For example, information retrieved based on the subject line or the sender of the e-mail message may be assumed to be of greater importance or relevance than information related to persons mentioned on the "cc" line or deep within the body of the e-mail message. For each piece of retrieved information, the evaluation step 105 may result in a decision to ignore the retrieved item, to cache it, to display it to the user, or to otherwise prioritize it in relation to other retrieved information. As will be described in more detail below, in one embodiment a Bayesian belief net is used to estimate the relevance of particular results, based on, for example, the number of occurrences of a particular result item, the amount of information available concerning the result item, the position of the query key in the primary document, the degree of confidence in the source of the information item, and the like.

In an alternative embodiment, additional queries may be formulated and sent (as described above in connection with FIG. 10) after received results are evaluated 105.

Each query result item may further include meta-data related to the query results, as will be described in more detail below.

In one embodiment, the invention takes into account the user's history with respect to the result item. If the result item has previously been provided to the user, it may be omitted so as not to present the user with redundant data. Alternatively, such a result item may be relegated to a less prominent location on the screen, or may be otherwise designated as being "old" data.

In one embodiment, steps 102 to 105 (and steps 109 and 110, if multi-stage querying is used) are performed automatically and in the background, without the knowledge of the end user. For example, upon receipt of an e-mail message in 101, the present invention can perform steps 102 to 105 even if the user is not actively using the e-mail application. Messages can be analyzed and queries sent and received by an e-mail server, so that the functionality of the present invention can operate even if the e-mail application is not active or even if the user's machine is turned off. In this manner, querying, retrieval, and evaluation can all take place before the user sees the original e-mail message itself. Thus, the results of the unconscious retrieval operations can be presented to an end user at the same time that the received e-mail message is presented, with little or no delay. In another embodiment, steps 102 to 105 may be performed while the user is reading e-mail, or at any other convenient time. In yet another embodiment, queries and results are transmitted and received at times of lower overall network usage, so as to conserve network bandwidth. Since, by definition, the user has not explicitly requested the information, he or she is not expecting an instant result; accordingly, the present invention can perform asynchronous queries and await results, and still be able to provide useful information at the time the user actually views the primary document.

Additionally, in environments involving portable computing devices, or dial-up access, or any other situation in which continuous network access may not be available, asynchronous unconscious retrieval may be used to pre-fetch information items that might be useful to the end user at a time when he or she is not connected to the network. In such environments, the invention may implement asynchronous retrieval according to techniques described in D. Poppink, "Query Preview, Unplugged!" (2001), the disclosure of which is incorporated herein by reference.

In one embodiment, results of step 105 are cached 106 for later display to the user. The cache mechanism may be any means for digital storage, such as a hard drive, random access memory, and the like. By caching the results, the present invention is able to provide true asynchronous querying and retrieval, since results can be obtained well before they are to be displayed to the end user.

The invention displays 107 results which have been deemed to be of sufficient importance and relevance to the user. In one embodiment, results are displayed in the context of the e-mail application itself, so that the user can view the information without shifting contexts. Results may be displayed according to a hypertext format, so that the user can click on words, phrases, or images within the displayed results and thereby obtain more detailed information or access related web pages or documents. One skilled in the art will recognize that many other channels or interfaces may be used for presenting results to the end user. Additionally, the retrieved information may be made available to conscious searches by users, and may be editable by end users as well.

In one embodiment, the present invention is implemented as a plug-in or bundled feature for a software application such as Microsoft Outlook, written in a programming language such as Visual Basic for Applications (VBA).

Functional Architecture

Figure 11:
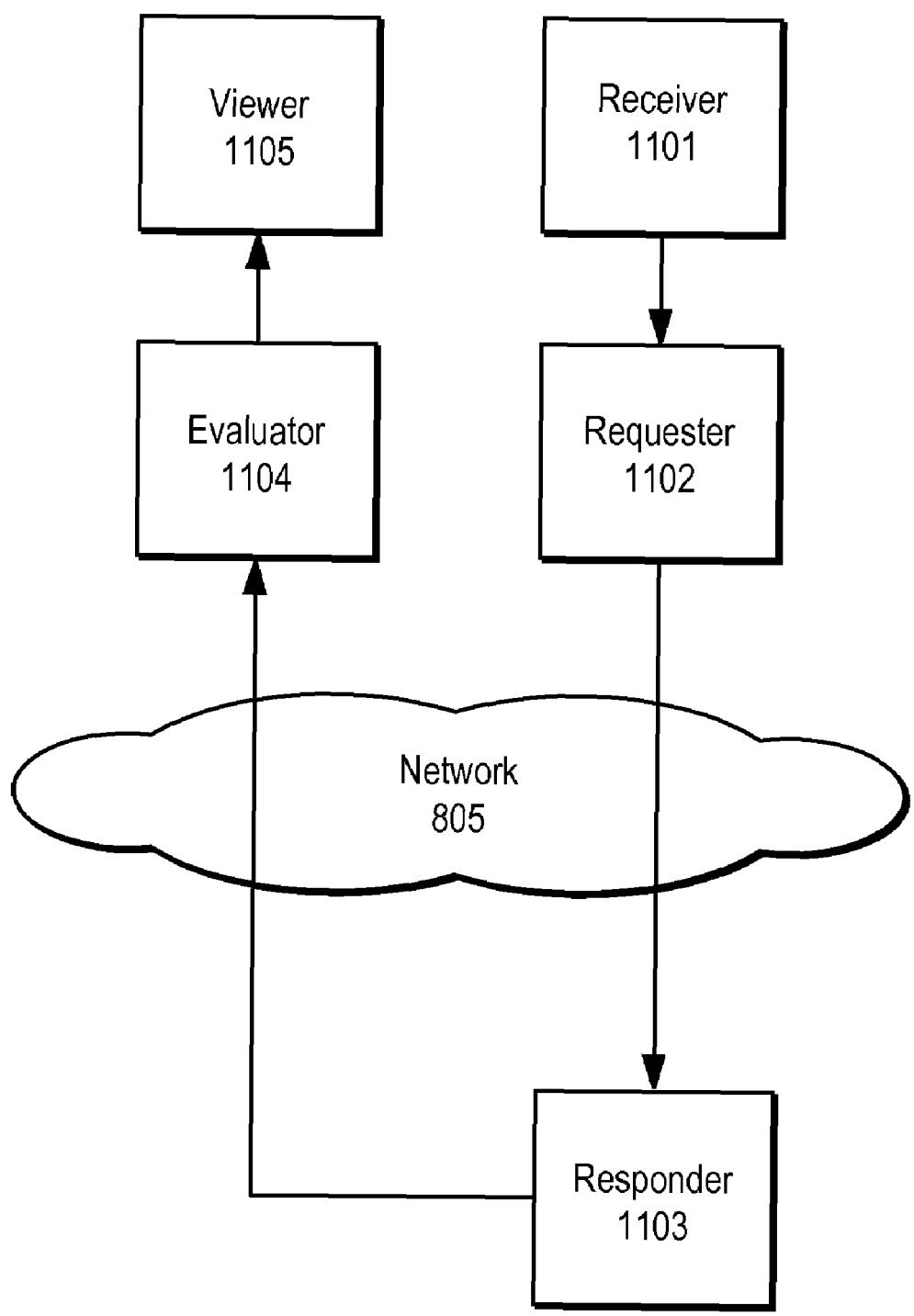
FIG. 11 is a conceptual block diagram depicting a high-level functional architecture according to one embodiment of the present invention.

Referring also to FIG. 11, there is shown a conceptual block diagram depicting a high-level functional architecture according to one embodiment of the present invention.

Receiver 1101 views and identifies interesting items in primary document 800. For example, receiver 1101 identifies people mentioned in an e-mail header (from, to, cc, bcc), people mentioned in the subject and body of an e-mail (identified either by name or e-mail, or using an existing item list, or using other knowledge of names and e-mails), and identifies other items such as dates, company names, and the like.

Requester 1102 sends requests for information to information appliances and other nodes. Requests may be sent over network 805. Requests may be sent using e-mail queries, as described below, or by other techniques and protocols. Requester 1102 may also:

request files from other users' computers;

may send additional information when needed to complete a query request; and initiate multi-stage queries.

Responder 1103 responds to query requests from other nodes. Responder 1103 may respond to requests by running a search on available data and transmitting the results. Results may be transmitted via e-mail or via any other mechanism or protocol. In one embodiment, responder 1103 can be configured to specify which information is to be shared, and can respond to query requests in accordance with such configurations.

Evaluator 1104 receives query results and evaluates their relevance in the context of the user's activities. Information is thus prioritized for display to the user. Evaluator 1104 can determine relevance upon manual request, or upon update of incoming information, or periodically, or upon receipt of data.

Viewer 1105 presents relevant data, based on query results, to the end user. In one embodiment, viewer 1105 displays information about people in a sidebar pane associated with the currently active window. Examples of a viewer 1105, including screen shots showing an exemplary user interface, are provided below. Viewer 1105 may also perform other functions, such as:

prioritizing the display based on relevance;

providing links to more details;

adding people to a contact list, and providing links to contact lists;

providing a manual search component;

providing user-configurable preferences for querying and displaying results;

providing sharing controls; and providing an interaction history.

Additional detail concerning the operation of each of the modules shown in FIG. 11 is provided below.

Figure 8:
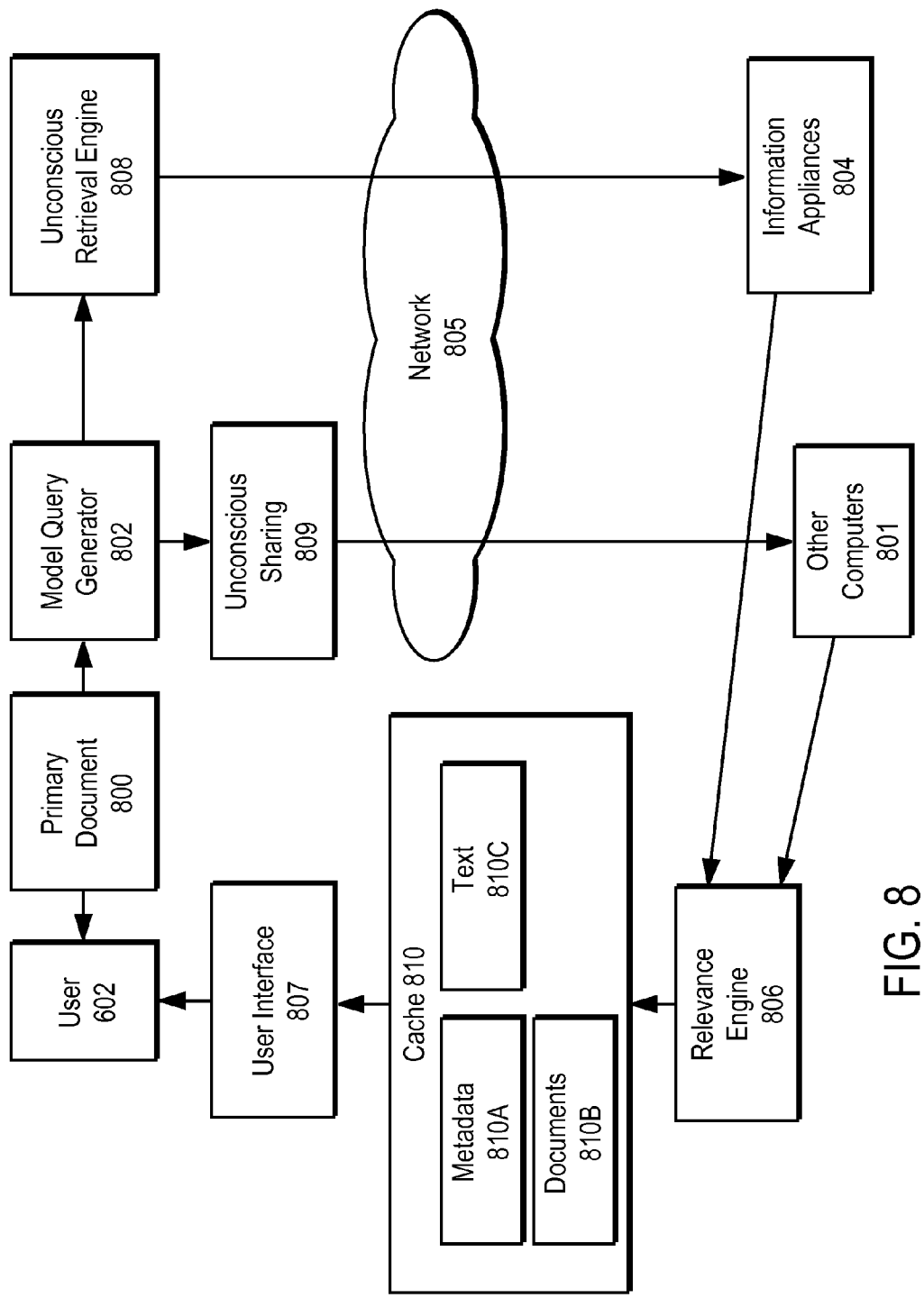
FIG. 8 is a block diagram depicting a functional architecture for one embodiment of the present invention.

Referring also to FIG. 8, there is shown a block diagram depicting a functional architecture for one embodiment of the present invention. Various components shown in FIG. 8 are specific examples of implementations of the functional components shown in FIG. 11, as indicated in the following description.

In one embodiment, model query generator 802 performs the analysis and key extraction step 102 on primary document 800, and generates queries.

Unconscious retrieval engine 808 performs the function of requester 1102 and sends queries to information appliances 804 via network 805.

In one embodiment, engine 808 sends a simple query to all nodes on the network. In another embodiment, engine 808 sends a complex query, and may prioritize recipient nodes according to the likelihood of receiving meaningful results from each node. In another embodiment, engine 808 may only send queries when new information is desired. In another embodiment, engine 808 may send different queries to different nodes depending on the degree to which each node is configured to share information and on the nature of the information available from each node.

In one embodiment, the present invention employs a peer-to-peer architecture using principles embodied in the Freenet network and described in I. Clarke, "A Distributed Decentralised Information Storage and Retrieval System," unpublished report, Division of Informatics, University of Edinburgh (1999), the disclosure of which is incorporated herein by reference. Freenet, which is further described at http://freenet.sourceforge.net, caches the same information on several computers. Different types of information receive different key values. A machine looking for a particular type of information, as identified by a particular key value, begins its search by contacting machines that have previously provided information have similar key values. Such a technique may be employed by the present invention to improve the performance of engine 808 in determining which nodes are likely to have the desired information.

Information appliances 804 act as responders 1103 to receive and respond to queries. Information appliances 804, as employed in the present invention, are context-aware devices capable of providing query results as well as useful meta-data in response to queries. In particular, information appliances 804 can provide meta-data such as:

the source of the result item;

the manner in which it is stored;

the characteristics of the result item itself;

the advantages, limitations, and estimated accuracy of query results; and pointers to additional data sources.

Each information appliance 804 may be configured to respond to queries according to the appliance's own context and available data, and to provide such additional meta-data as may be appropriate.

In one embodiment, queries and query results are transmitted across network 805 using an e-mail protocol, so that the invention is able to obtain results even when information appliances 804 are located behind a firewall. In addition, this technique facilitates asynchronous querying—if an information appliance 804 is unavailable or disconnected at the time engine 808 sends a query, the query will remain in appliance's 804 in-box or in an associated e-mail server (not shown) until appliance 804 is reconnected and available. At such time, appliance 804 can read the query and respond via e-mail. Similarly, if the user's machine is unavailable or disconnected at the time the query results are received, the results will remain in the user's machine's in-box until the user's machine is reconnected and available. At such time, the query results can be read and evaluated by relevance engine 806, stored in cache 810, and/or presented to the user via user interface 807, as described in more detail below.

One skilled in the art will recognize that the e-mail transmission scheme described herein is merely one example of a transmission mechanism for queries and query results, and that any other mechanism or protocol may be used for transmitting queries and query results to and from information appliances 804.

Results from information appliances 804 are received by relevance engine 806, which acts as evaluator 1104 to evaluate 105 results as described above. In one embodiment, output from relevance engine 806 is stored 106 in cache 810 until it is displayed 107 via user interface 807, which acts as viewer 1105. Thus, retrieval and evaluation of results may proceed asynchronously, and results may be presented to the user at a later time. Cache 810 may be implemented using any known techniques for temporary storage of digital information, such as for example a hard drive located at the user's computer, a hard drive located at a server computer, random access memory, or any other storage medium. Cache 810 may include, for example: metadata cache 810A for storing metadata concerning retrieved documents; document cache 810B for storing document files; and text cache 810C for storing text versions of documents. For particular documents, any or all of these various types of data may be stored. One skilled in the art will recognize that cache 810 may take any form, and may store other types of data describing documents and other results.

In addition, as will be described in more detail below, other computers 801 may contain information useful to user 602 and related to primary document 800. Unconscious sharing module 809 may thus send queries generated by query generator 802 to other computers on the network (such as computers being operated by other users). Transmission of queries and query results to and from other computers 801 may take place via e-mail as described above, or via any other transmission protocol. Other computers 801 may be configured to respond to queries sent via e-mail, as described above in connection with information appliances 804. Results from other computers 801 are received by relevance engine 806 and evaluated 105 as described above.

Additional descriptions of the functionality of each of the modules of FIG. 8 are provided below.

Multi-Stage Query Method

Figure 9:
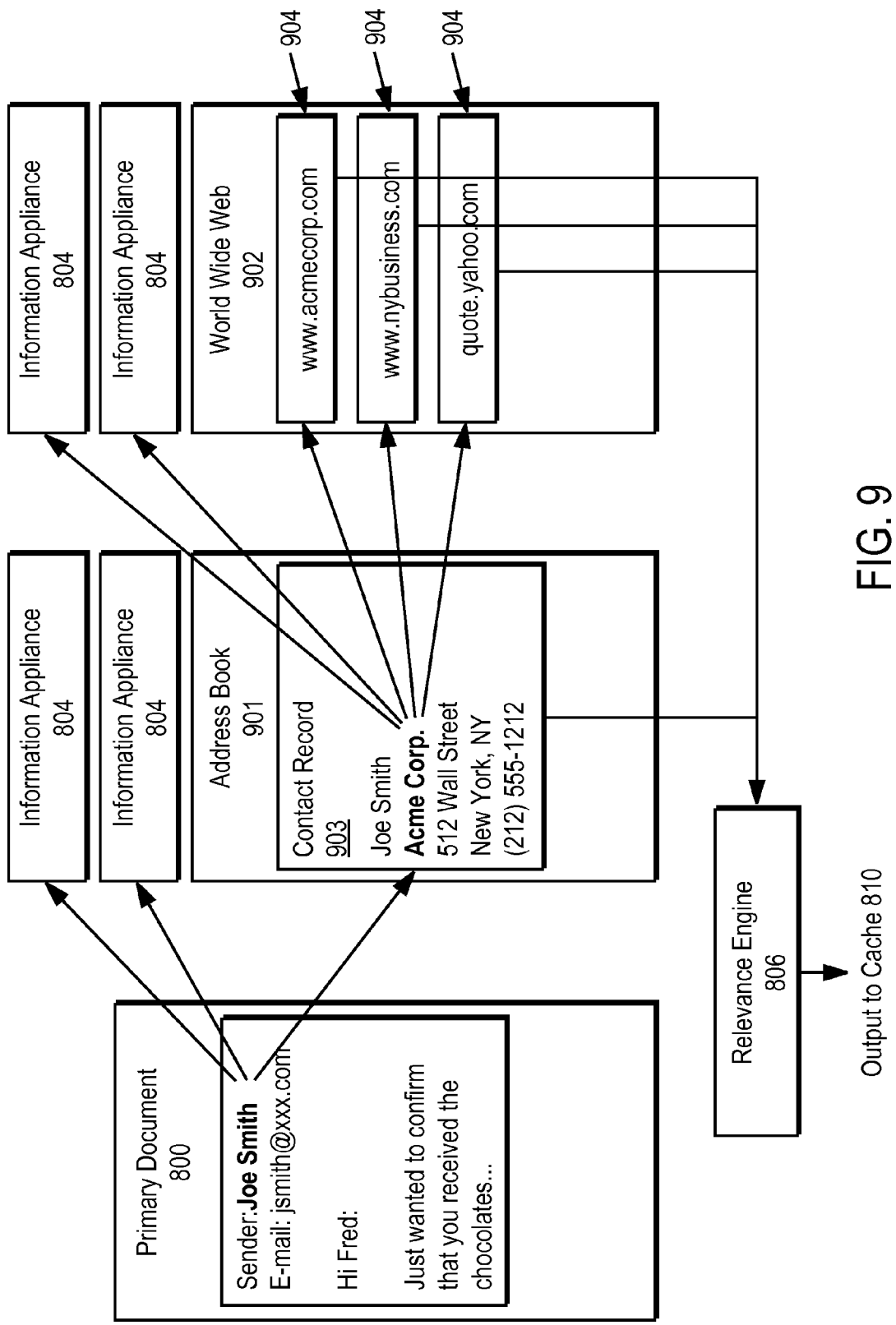
FIG. 9 is a block diagram depicting an example of a multi-stage query as performed according to one embodiment of the present invention.

As described above, the present invention performs multi-stage queries, making inferences from a first set of result items as to likely additional sources of information which are then queried using the original query terms and/or terms derived from the first set of result items. Referring now to FIG. 9, there is shown an example of a multi-stage query as performed according to one embodiment of the present invention.

Primary document 800 is an e-mail message from Joe Smith. Joe Smith's name is extracted from primary document 800 and is given significant weight since the name is indicated as belonging to the sender of the message. The invention queries various information appliances 804 (or other sources), including address book 901, which may be a conventional address book stored in a central location or on another user's computer, or on the same computer that received primary document 800. Record 903, containing Joe Smith's contact information, is retrieved in response to the query and transmitted to relevance engine 806 for further analysis.

In accordance with the multi-stage, or cascading, query technique of one embodiment of the present invention, elements of Joe Smith's contact record 903 are used in formulating a second-level query. The second-level query may contain, for example, the name of Joe Smith's employer, Acme Corp. The second-level query may include terms from contact record 903 as well as terms from the initial query that was formulated from primary document 800 (i.e. containing Joe Smith's name), or it may just include terms from contact record 903. The invention may query various information appliances 804 using the new query terms, and the particular information appliances 804 (or other sources) may be determined based on the type of data represented by the new query terms. The invention thereby takes into account the context in which result items appear, both in formulating further queries and in evaluating query results.

In the example shown, the second-level query containing the name of Joe Smith's employer is performed on a World Wide Web business directory 902. The query produces web links 904 containing information related to Acme Corp., which are transmitted to relevance engine 806 for further analysis. Relevance engine 806 can thus compare the first-level results with the second-level results in order to determine which results to display to the user, and in what order or arrangement the results should be presented. The results are then sent to cache 810 for eventual output to the user.

User Interface 807

Retrieved results can be presented to the end user in any of a variety of different ways and in the context of any of a variety of different user interfaces. For example, results might be displayed in a separate window on a display screen, or in a pane attached to a currently active window, or in a "pop-up" format that presents related information when the cursor is passed over a particular item on the screen. Results may appear on the screen automatically, or, alternatively, buttons or icons may be displayed in a toolbar or other area of the screen; the user may click the buttons or the icons (or place the cursor over them, or otherwise activate them) to cause the results to be displayed. Alternatively, existing words or images already displayed on the screen may be made into hyperlinks, so that the user can click on them (or place the cursor over them, or otherwise activate them), to cause the results to be displayed. Results may also be sent to the user via a communication channel (such as e-mail, fax, and the like), either in unabridged or in digest form.

Figure 2:
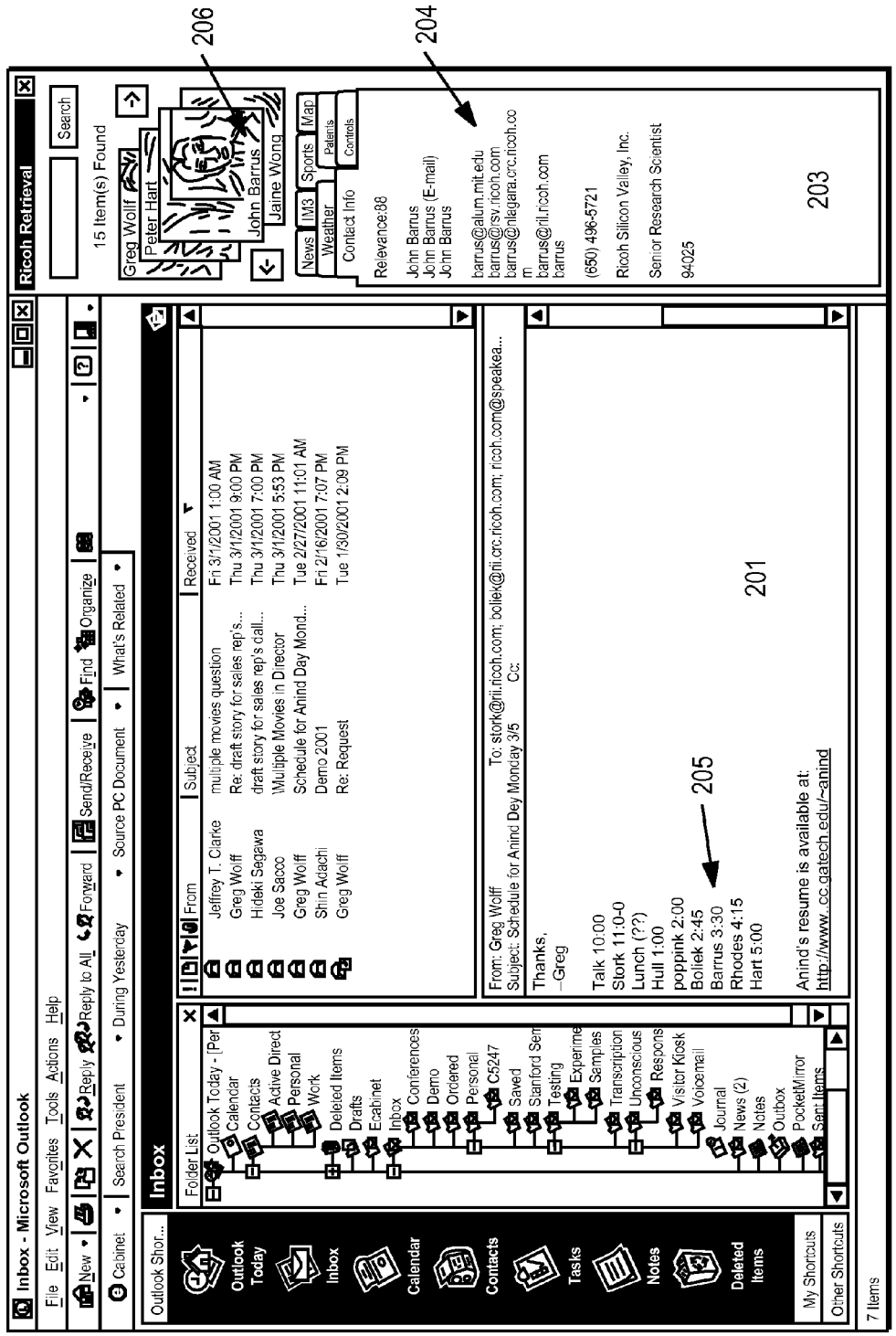
FIG. 2 is an example of a user interface for displaying information to an end user in a sidebar pane, according to one embodiment of the present invention.

Referring now to FIG. 2, there is shown an example of a user interface 200 for displaying information to an end user in a sidebar pane, according to one embodiment of the present invention. In the example of FIG. 2, sidebar pane 203 is displayed alongside conventional e-mail program window 201, so that the end user can view retrieved information without leaving the e-mail application. In the example shown, retrieved information includes contact information 204 and photographs 206 that are relevant to a received e-mail message 207. Specifically, the name "Barrus" 205 has been extracted from message 207 and a query based on the extracted name has yielded the information displayed in sidebar pane 203, including contact information 204 (e-mail addresses, phone number, company name, and the like) and a photograph 206 of John Barrus. In one embodiment, additional information may be accessible via sidebar 203 by clicking on displayed data or on navigation buttons within sidebar 203. The user can thus explore the set of available information without leaving the context of the e-mail application.

Referring now to FIG. 3, there is shown an example of a user interface 300 for displaying information to an end user in the context of a calendar interface, according to one embodiment of the present invention. Interface 300 presents a calendar view as is available from conventional scheduling applications such as Microsoft Outlook. Icons 301 are displayed alongside particular items or dates. The user can click on icons 301 to access related information 302 derived from the results of the techniques of the present invention. In one embodiment, icons 301 may provide an indication of the type of information that is available (such as documents, contact information, related meetings, and the like). One skilled in the art will recognize that the arrangement of icons 301 and related information 302 shown in FIG. 3 is merely exemplary, and furthermore that such an interrelationship among the primary interface, icons 301, and related information 302 can also be implemented in interfaces other than a calendar interface.

Figure 4:
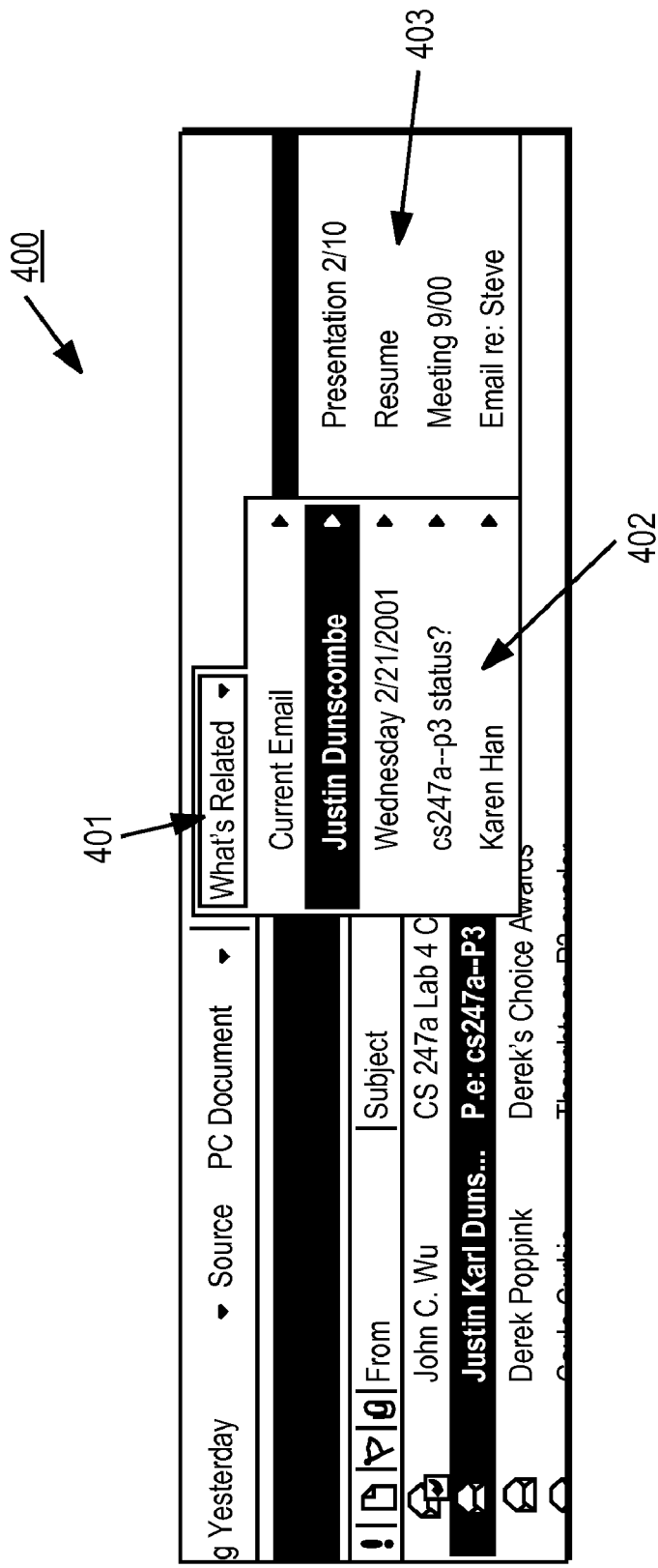
FIG. 4 is an example of a user interface for displaying information to an end user via a toolbar menu, according to one embodiment of the present invention.

Referring now to FIG. 4, there is shown an example of a user interface 400 for displaying information to an end user via a toolbar menu 402, according to one embodiment of the present invention. Interface 400 may be integrated into a conventional productivity application or communications application, such as Microsoft Word, Microsoft Outlook, Microsoft Excel, and the like. Toolbar button 401, labeled in the example at "What's Related," provides access to pull-down menu 402, which is activated when the user clicks on button 401. Menu 402 contains entries for a number of identified information items for which related information is available. In one embodiment, the contents of menu 402 represent information items related to or found in a currently selected file, message, document, or other collection of information. By moving the cursor over the various items in menu 402, he or she can access submenu 403 for selecting particular results that have been retrieved according to the unconscious retrieval mechanisms described above. In this manner, the user can access related unconsciously retrieved information for any of a number of data items.

Figure 5:
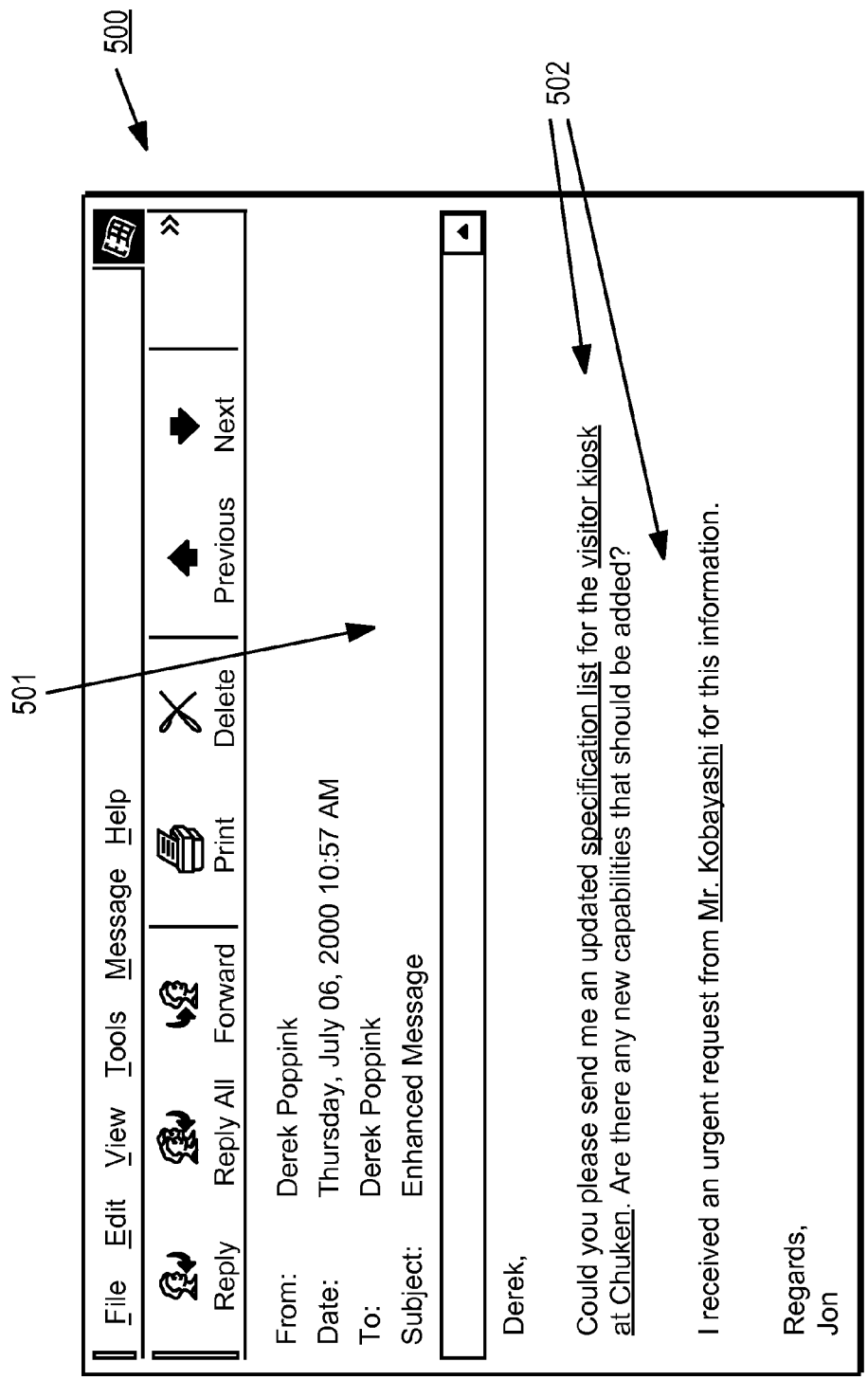
FIG. 5 is an example of a user interface for providing hyperlinks in a document to provide access to related information, according to one embodiment of the present invention.

Referring now to FIG. 5, there is shown an example of a user interface 500 for providing hyperlinks 502 in a document 501 or message to provide access to related information, according to one embodiment of the present invention. Interface 500 may be integrated into a conventional productivity application or communications application such as Microsoft Word, Microsoft Outlook, Microsoft Excel, and the like. Individual words in document 501 are automatically designated via underlining, or by some other formatting technique, as hyperlinks 502. The user may click on (or place the cursor over) hyperlinks 502 to access particular results that have been retrieved according to the unconscious retrieval mechanisms described above. In this manner, the user can access related unconsciously retrieved information for any of a number of hyperlinked words or phrases. In an alternative embodiment, images may be hyperlinked as well as words.

Figure 13A:
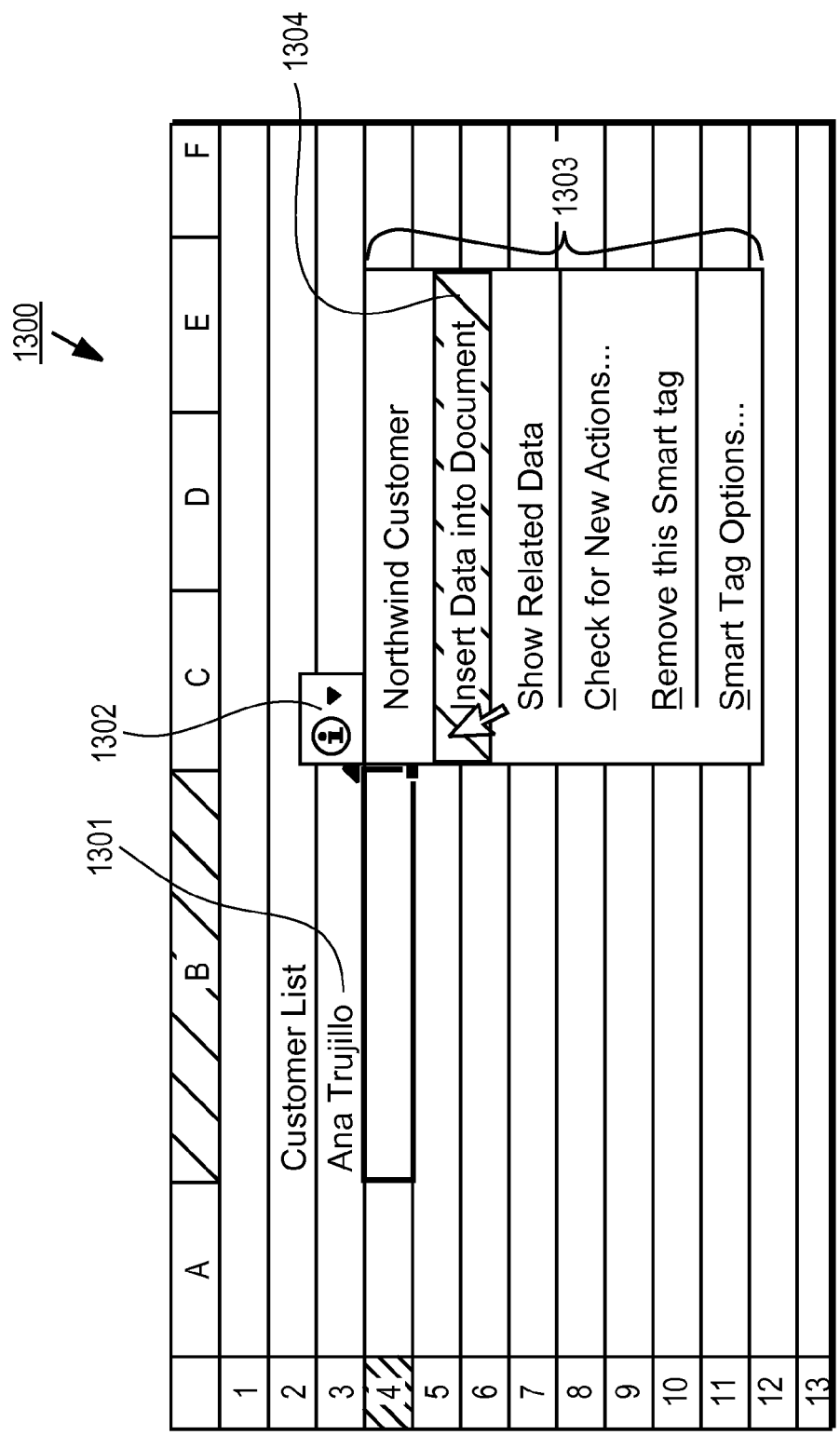

Referring now to FIG. 13A, there is shown an example of a user interface 1300 for displaying related information via "smart tags." Smart tags are components implemented in various products, including Microsoft Office XP, available from Microsoft Corporation. Smart tags recognize certain kinds of information 1301 entered by the user. When a smart tag recognizes a pattern of information, such as a name, address, or stock quote, it brings up icon 1302. The user can click on icon 1302 to activate menu 1303, which offers several commands 1304 for performing various actions on information 1301. One such command 1304 inserts data related to information 1301 into the document. Referring now to FIG. 13B, there is shown interface 1300 after related data 1305 has been inserted. Smart tags are described in more detail in, for example, "Overview of Smart Tag Technology in Office XP" (Microsoft white paper, available at http://www.Microsoft.com/office/developer/platform/smartag.htm), and C. Kunicki, "Interacting with Smart Tags", *Microsoft Office & Visual Basic for Applications Developer*, 2001. Both of these documents are incorporated herein by reference.

In one embodiment of the present invention, smart tags as depicted in FIGS. 13A and 13B may be used to provide access to particular results that have been retrieved according to the unconscious retrieval mechanisms described above. For example, related data 1305 may include unconsciously retrieved data. Menu 1303 may contain additional options for accessing more detailed information that has been unconsciously retrieved. One skilled in the art will recognize that other techniques similar to smart tags may be employed to similar effect.

In any of the above mechanisms for presenting results to users, the results may be displayed according to one or more of the following formats: alert box, summary information, and/or a mechanism for retrieving the complete results. Various user controls and dialog boxes for specifying preferences and options may also be provided, such as for example a manual search field, controls for hiding or deleting information items or sources from further retrievals, controls for specifying relevance thresholds, controls for specifying how information of different relevance levels should be treated, and controls for manually adding information to information appliance storage facilities.

Query Preview Interface

Figure 14:
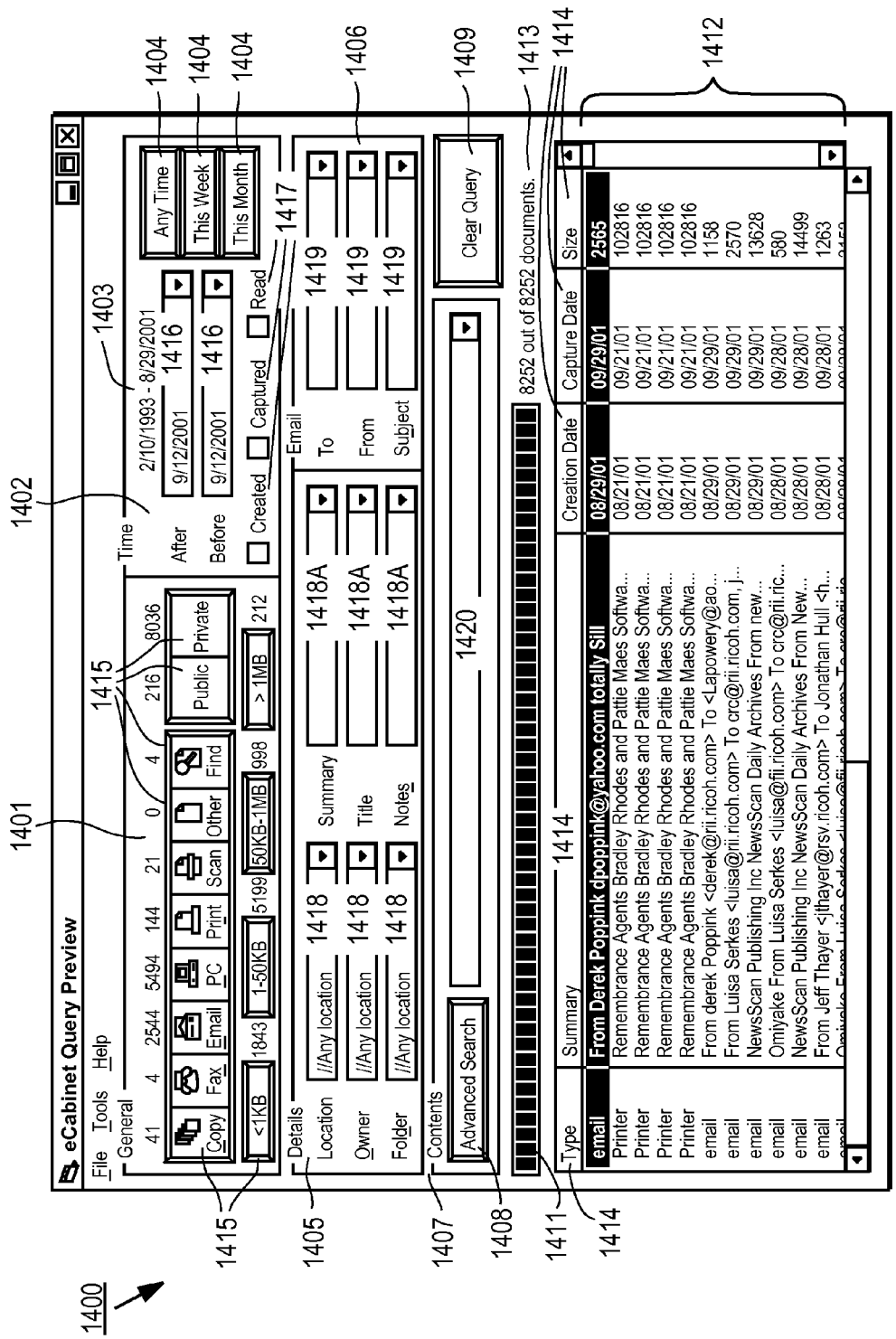
FIG. 14 is an example of a user interface for a query preview interface according to one embodiment of the present invention.

Referring now to FIG. 14, there is shown an example of a user interface 1400 for a query preview function according to one embodiment of the present invention. According to this embodiment, results of the above-described unconscious retrieval techniques can be presented in an interactive manner that responds in real time to user queries. One skilled in the art will recognize that query preview interface 1400 can also be used in other contexts for displaying query results, and is not limited to presenting results of unconscious or asynchronous retrieval.

In one query preview implementation, the system unconsciously retrieves relevant metadata of the information source (such as information appliances 804) to assist browsing and searching. The metadata describes the contents of the database, and is generally smaller than the data itself. Query preview interface 1400 allows user queries to be checked against the metadata and results to be presented in real time, avoiding the need to query across network 805.

The query preview technique takes advantage of the fact that many information requests do not require the full version of the original document. For example, a user may wish to obtain the e-mail address of a recent correspondent, or the date a report was last modified. These requests can be satisfied with just the metadata of the collection or text-only versions of the documents. In many situations where the original documents include formatted files and high-resolution images, the text-only versions are much smaller, and can be more easily retrieved and provided to the user.

In one embodiment, the present invention performs asynchronous, unconscious retrieval as described above to obtain metadata, and may also asynchronously and unconsciously obtain additional information, including full versions of original documents and/or text versions of documents, where such additional information is likely to be requested by the user. The invention may generate a local full-text index, which can then be searched in response to user queries. Accordingly, query preview interface 1400 presents results based on obtained metadata, and may respond to additional user requests for information without having to perform additional downloading. If a user requests a document that has not been retrieved, and a network connection is available, the document is retrieved. If a network connection is not available, the user is given the choice of viewing the text-only version or directing the invention to asynchronously retrieve the document and display it when it becomes available.

Query preview interface 1400 provides access to information and documents stored on an information appliance 804 or other information source, such as for example a Ricoh eCabinet, files stored on a desktop computer or any other document storage system, such as Lotus Domino or Microsoft Exchange.

In one embodiment, the invention stores metadata for personal and shared documents in metadata cache 810A. This activity may take when the invention is made aware of an information appliance 804, for example when the user enters its network address. Using this information the application begins downloading the metadata, which may be accomplished as described above in connection with steps 104 through 106 of FIG. 1. As described above, retrieved information may be analyzed by relevance engine 806 to determine the likelihood that the information will be relevant to the user.

In one embodiment, cache 810A stores metadata according to fifteen fields. Six of the fields are general document descriptors. These include the owner, the size in bytes, whether the document is public, the type (printer, copier, e-mail, PC, scanner, fax, saved query, or unknown), and a unique serial number. The location field holds the relevant information appliance's 804 network address.

There are also three date/time fields. The creation date indicates when the document was created (which may be determined from the file system). The capture date reveals when the document was indexed by the information appliance 804. Multiple versions of a document may have the same creation date but different capture dates. The creation date of an e-mail message is the time it was sent, while the capture date is the time it was received. For some types of documents these two dates are identical. The information appliance 804 also keeps track of the date the document was last read.

Lastly, there are six text fields, two general and four specific. Three of the fields are specific to e-mail messages, including subject, to, and from fields. The filename field is specific to documents. The general summary field contains approximately a hundred characters of the document contents. The notes field contains annotations added to documents. A user may add individual annotations using the web interface or create capture rules that automatically add annotations to certain types of documents.

The size of the metadata is generally much smaller than the document contents themselves.

Many information appliances 804 create text versions of all captured document. In one embodiment, when the present invention loads metadata for new documents, it also begins sequentially downloading the text versions of those documents. This operation may be performed unconsciously and asynchronously. These text files are parsed, creating an inverted index to facilitate searching. An inverted index stores a list of all the words occurring in a set of text documents, along with position information for every occurrence of a word. The index can then be used for various text searches.

For many document types (for example Microsoft PowerPoint or Adobe Acrobat files), the text version occupies significantly less space than the original version. Thus, even when full-text versions are stored, significant space savings can be realized.

The query preview interface shown in FIG. 14 presents query controls and results together in a common window. As the user adds or subtracts fields from the query, the results are updated immediately, thus providing useful feedback and giving the user a sense of control. Results may contain items that have been unconsciously and asynchronously retrieved according to the techniques described above.

The upper portion of the interface is used to construct queries, while the lower portion is used to display the results. The query portion of the interface includes controls for the various metadata fields and a control for full-text search, as described in more detail below. AND operations are used between fields, and OR operations are used within certain fields. Such a design allows the user to rapidly explore the collection of available documents. The query controls are sorted into five groups: general 1401, time 1402, details 1405, e-mail 1406, and contents 1407.

Different types of controls are used to represent different metadata fields. General section 1401 includes buttons 1415 functioning as checkboxes. Buttons 1415 may be used to select the type of document to look for, the size range, and whether the document is public or private. In the example of FIG. 14, there are eight document types and four size ranges to choose from. If no buttons within a group are checked, the field corresponding to that group is not included in the query. If only one button in a group is checked, only documents matching that button will be displayed. If more than one button in a group is checked, documents matching any of the choices will be returned. Thus checking "E-mail" and "Fax" will return documents of both types. Checking "Public" and "Private" is the same as leaving both unchecked, since those are the only two buttons in the group.

Above or beside each button a label indicates how many documents of the matching type remain in the query set. This helps the user avoid zero-hit queries, by presenting statistical information about the overall document set.

Time section 1402 includes two controls 1416 for picking dates and three checkboxes 1417 labeled Created, Captured, and Read. By default, both date-picking controls 1416 display the current date, and when selected activate a month display which allows the user to select a day and/or to scroll to other months. Other mechanisms for selecting a date, such as for example direct text entry, may be implemented. Each checkbox 1417 corresponds to one of the date fields in the metadata cache. If one of checkboxes 1417 is checked, the query returns documents within the picked range for the selected field. If one of the dates in controls 1416 is changed before a checkbox 1417 is selected, the creation and capture boxes are checked by default, allowing a user to query by date with fewer button presses.

Above date-picking controls 1416, label 1403 displays the range of dates covered by the current set of documents. Like the labels above the buttons in the general section, this presents useful statistical information about the overall document set.

The right portion of time section 1402 includes three buttons 1404 which set (or unset) the time range and appropriate checkboxes 1417. The "Any Time" button clears checkboxes 1417. The "This Week" and "This Month" buttons fill in dates corresponding to the current week and the current month, respectively, in controls 1416 and also update label 1403 accordingly.

Details section 1405 includes six drop-down combo boxes 1418. The Location, Owner, and Folder boxes 1418 are initially filled with possible choices, as each of these fields contains a relatively limited number of values. Each of the three controls 1418 also includes an "Any" choice. As changes are made to other fields, the list of choices is dynamically updated in each combo box, again preventing zero-hit queries.

The other three combo boxes 1418A (Summary, Title, and Notes) in details section 1405 and combo boxes 1419 (To, From, and Subject) in e-mail section 1406 are filled by the user. If text is entered in one of these controls 1418A or 1419, only documents where the selected field contains the entered text will be returned. In one embodiment, the invention waits until the searcher hits the enter key or selects another control before updating the displayed results.

In addition, terms entered in these controls 1418A and 1419 will be added to the respective combo boxes 1418A and 1419, creating a history of previous searches in each field. Future searches for the same text are then possible without additional typing. The topmost choice in each drop-down list 1418A and 1419 is an empty string, followed by the most recent searches. These terms are stored from session to session, unless explicitly cleared by the user.

Contents section 1407 allows the user to search the full text of the documents. It contains a single text field 1420. Like the previous text controls 1418A and 1419, the search field 1420 maintains a list of previous searches. The results are updated when the user hits the enter key or selects another control.

Advanced search is possible in search field 1420 using supported operators (such as "+", "−", and quotation marks), or by pressing advanced search button 1408. Pressing advanced search button 1408 pops up a small window (not shown) showing text fields and various operators (such as "all", "any", "phrase", and "not"). Once the search window is dismissed, field 1420 is filled in with corresponding search parameters, and then returns the focus to the main window 1400.

Clear Query button 1409 resets all the buttons and combo boxes. This reduces the number of actions required to clear multiple fields after a search.

The lower half of interface 1400 includes documents bar 1411 and list of document results 1412. Each change to the query controls in the upper half of interface 1400 updates both bar 1411 and the visible portion of list 1412. Since list 1412 is based on results that have previously been unconsciously and asynchronously retrieved, the updates can be provided relatively quickly. In one embodiment, the invention continues filling results list 1412 until list 1412 contains all results or until the query is changed again.

Documents bar 1411 depicts the proportion of documents matching the current query relative to the total number of documents in the collection or in the total set of documents. Text label 1413 displays the exact number of matching documents. This information is useful to the user when narrowing the number of matches to an amount that is easy to browse.

Document results are displayed in list 1412 with columns 1414 for each metadata field. Scrolling vertically allows the searcher to see more documents. Scrolling horizontally allows the searcher to see other fields. Resizing interface 1400 resizes the results area, allowing the searcher to see more documents at one time.

The results can be sorted by clicking on any of column headers 1414, and the sort order is maintained even if the query is changed or cleared. The default sort is reverse-chronological. The fields may also be resized or reordering by dragging and dropping. The location and size of the columns is saved between sessions, allowing the searcher to personalize the application.

Figure 15:
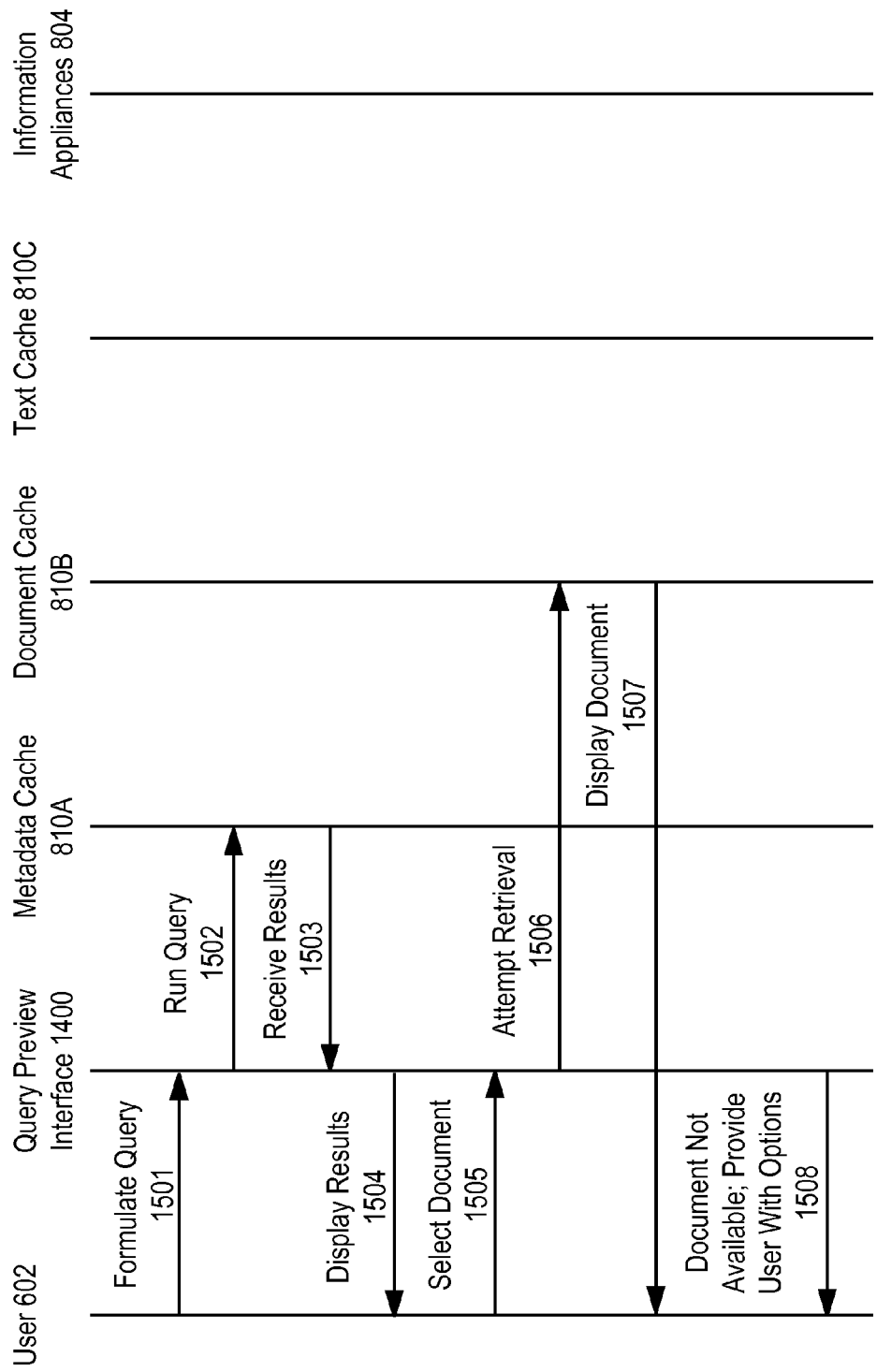
FIGS. 15, 16, and 17 are event diagrams showing a method of displaying query results using a query preview interface according to one embodiment of the present invention.
Figure 16:
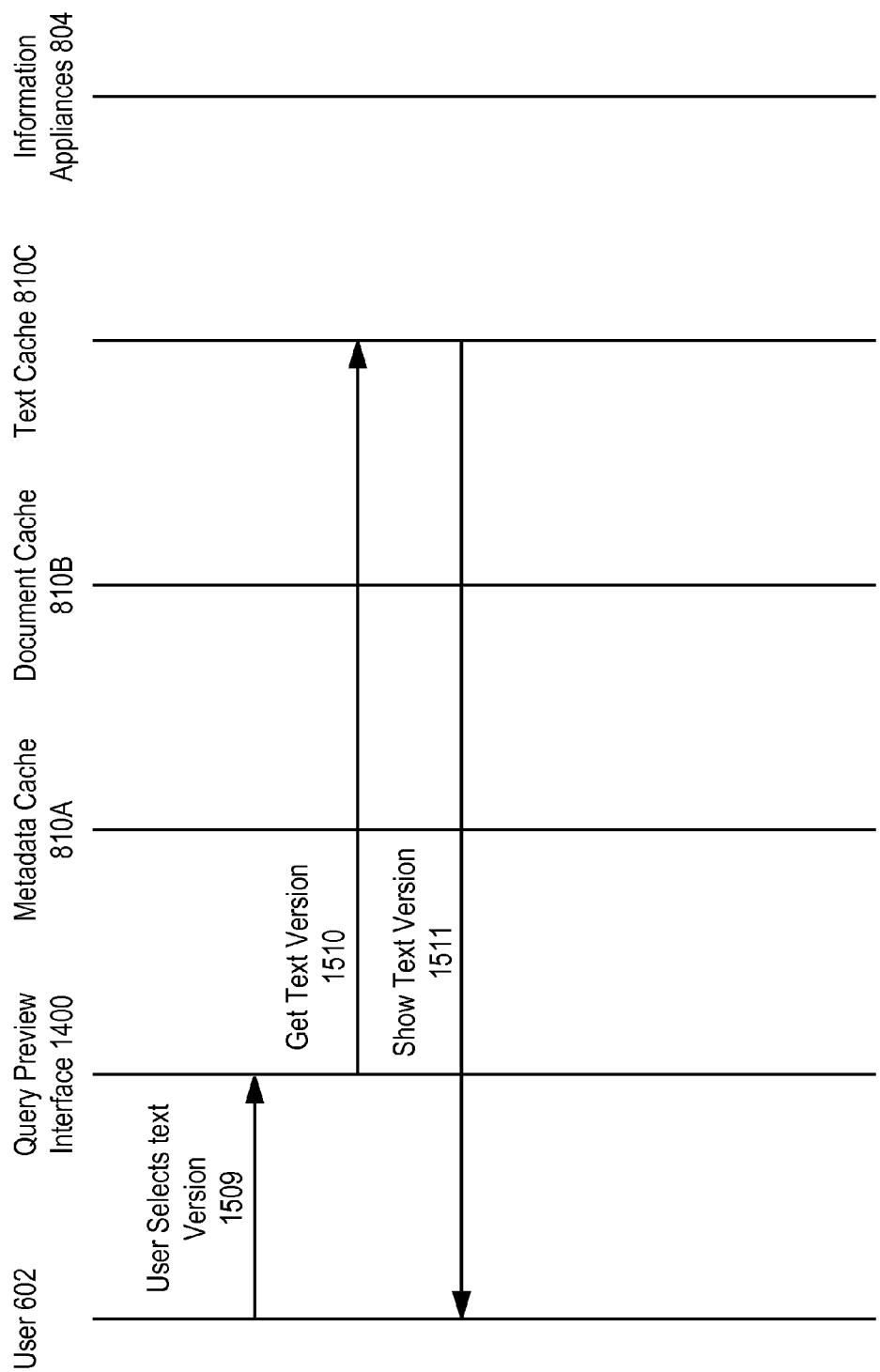
Figure 17:
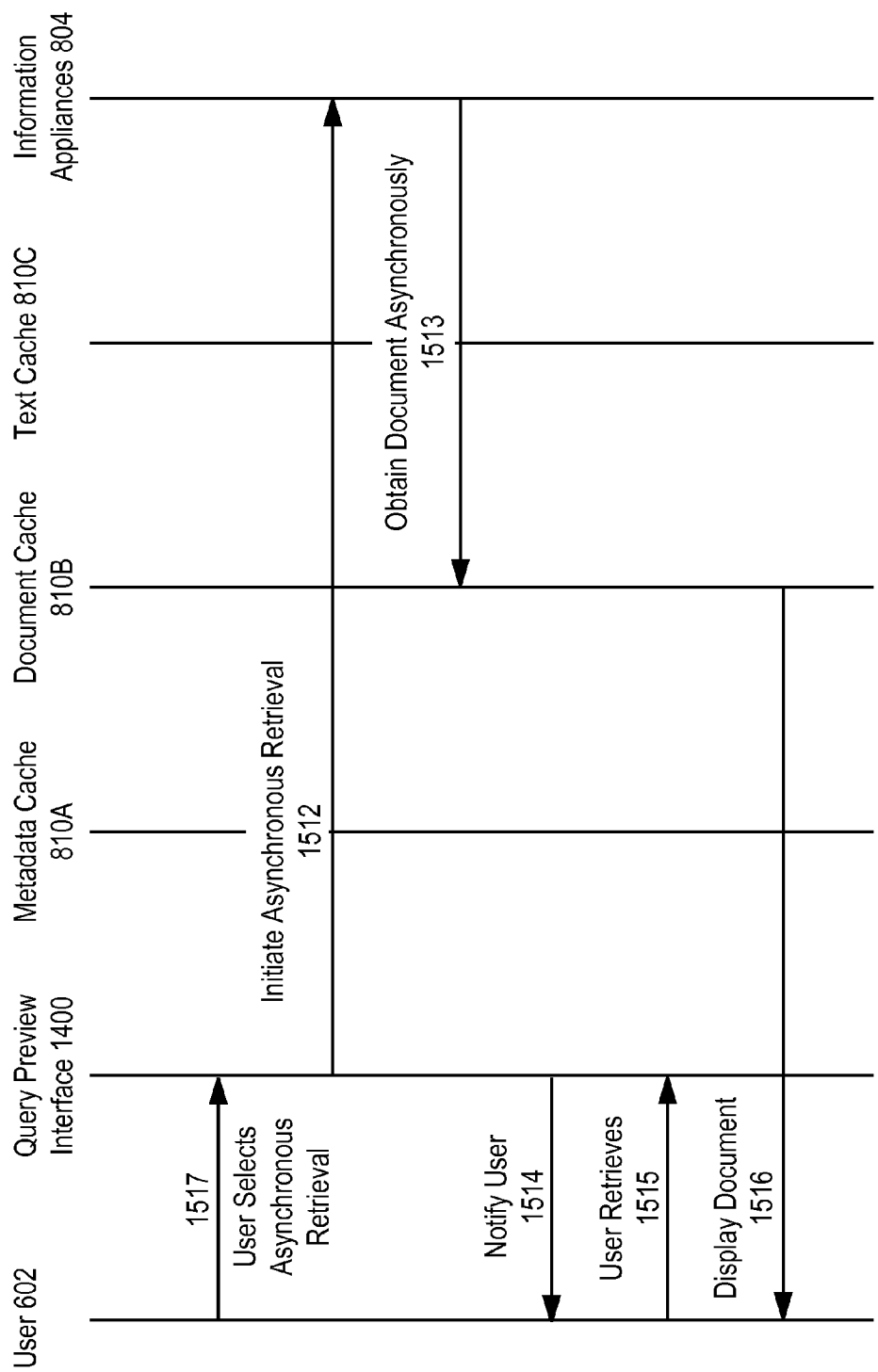

Referring also to FIGS. 15 through 17, there are shown event diagrams depicting a method of displaying query results using query preview interface 1400 according to one embodiment of the present invention. User 602 formulates 1501 and runs 1502 a query using the above-described upper portion of interface 1400. Interface 1400 receives 1503 and displays 1504 query results in list 1412, as described above. When the user selects 1505 a document (for example, by double-clicking on an item in list 1412), the invention attempts 1506 to retrieve the original document, either from previously retrieved documents that have been obtained via the asynchronous and unconscious techniques described above and cached in document cache 810B, or from an information appliance 804, or from some other source. In one embodiment, the original document is retrieved by constructing a URL using the network address of the information appliance 804 or other source and the serial number of the document, opening a browser window, and instructing the browser to retrieve the document specified by the URL. The response time will vary based the size of the document, whether the document was previously retrieved unconsciously, and the characteristics of the network connection. If the document is available, it is displayed 1507.

In one embodiment, if the document is not available directly and has not been previously retrieved, the user is presented 1508 with two options: viewing the text of the document or retrieving it asynchronously.

Referring also to FIG. 16, if the user elects 1509 to view the text contents of the document, and if a text version has been obtained, the invention retrieves 1510 and displays 1511 the text version. In one embodiment, the invention opens a copy of the document in a text reading application (such as Microsoft WordPad). The user can then freely manipulate the text or save it to a file as desired. The invention preserves its version of the text.

For some types of documents, such as e-mail messages, the text version is nearly identical to the original. For other types of documents (such as Microsoft Word or Microsoft PowerPoint files), the text will be accurate, but certain formatting and graphics may be unavailable. For documents that have been printed, scanned, or copied, the quality of the recreation will match the quality of the optical character recognition (OCR).

In one embodiment, the user may also view the text version by right-clicking on a document in list 1412 and selecting the appropriate menu item from a context-sensitive popup menu.

Referring also to FIG. 17, if the user elects to view the actual document, where the document is not currently available (because, for example, no network connection is currently active), the user can elect 1517 to initiate an asynchronous retrieval request. Once the request has been initiated 1512, the invention waits until a network connection is available. When the network connection becomes available, the invention retrieves 1513 the document asynchronously and notifies 1514 the user (for example, via an e-mail message) that the retrieval is complete and that the document is available. The notification message may contain a direct link to the retrieved document. If a direct connection is not possible (for example, if the document is behind a firewall), an e-mail query is sent to a client device behind the firewall, according to the query techniques described above. Software running on the client interprets the query, retrieves the document, and returns it to the querying device via e-mail. The invention can then notify the user that the document is available, and/or forward it directly to the user. The user retrieves 1515 the document and the invention displays 1516 it.

In one embodiment, the query preview interface 1400 and above-described functionality is implemented in Visual Basic 6.0, along with the eCabinet SDK. In one embodiment, the metadata cache and full-text index utilize a Microsoft Access database, and the application runs on Windows desktops and laptops.

One skilled in the art will recognize that the particular arrangements, layouts, functionalities, and method steps depicted in FIGS. 2 through 5, 13A and 13B, 14, 15, 16, and 17 are merely exemplary, and many other implementations of unconscious retrieval and presentation may be constructed without departing from the essential characteristics of the present invention. One skilled in the art will further recognize that the present invention may be implemented in contexts other than an e-mail application, and that the particular visual elements shown in FIGS. 2 through 5 and 13A and 13B are merely examples of user interface components related to an e-mail-based implementation. Other features, buttons, layouts, and functionality may be implemented for other applications and environments in which the present invention may be implemented.

Query Generator 802

Step 103 described above in connection with FIG. 1 includes formulating and sending queries to obtain relevant information. This step may be performed, for example, by model query generator 802. In one embodiment, queries are formulated by combining key words from the text of the primary document. In formulating such queries, the present invention may advantageously seek to include words tending to have high information content, and to omit words tending to have lower information content. For example, the invention may extract as keywords personal names, company names, dates, e-mail address, ZIP codes, and the like. Such extraction may take place according to well-known parsing mechanisms for identifying and extracting information having a known format. Alternatively, the invention may take advantage of tags in identifying particular types of information, particularly if the primary document is encoded in an extended markup language (XML) format. Alternatively, the invention may take advantage of word placement and/or neighboring language, such as the phrase "Address:" followed by text, which tends to indicate that the text is an address. By focusing on and emphasizing words and phrases that represent relatively distinct information-carrying items, the present invention provides a more efficient mechanism for searching for related information items.

In addition, the type of information identified in the primary document may be used to select the particular resources to be queried. For example, when a company name is identified, a web directory might be queried; when a person's name is identified, a contact list or company directory might be queried; and when a city name is identified, a website providing local information pertaining to the city might be queried. Any combination of resources might be queried for any given primary document, so that information items may be obtained from multiple sources of data and combined in a manner that is useful to the end user.

In alternative embodiments, the present invention may formulate queries based on non-textual components of a primary document. For example, image similarity can be employed to retrieve images related to those found in the primary document, or speaker identification may be used in connection with an auditory component of a primary document, so as to identify a speaker and find related information concerning the identified speaker, or to find related voice-mail messages or auditory recordings. Techniques of image similarity and speaker identification are well known in the art. See, for example, T. Chen et al., "Image Similarity", available at http://www.crl.research.digital.com/vision/multimedia/similarity/default.htm. Speaker identification and speech recognition software is available from SpeechWorks International, Inc. of Boston, Mass., described at http://www.speechworks-solutions.com. Well-known speaker identification and speech recognition techniques are also described at http://fife.speech.cs.cmu.edu/comp.speech/Section6/Q6.6.html.

Relevance Engine 806

As described above in connection with FIG. 1, results of queries are in one embodiment evaluated 105 before they are presented to the end user. Evaluation of received results may be performed by relevance engine 806, according to known techniques of applying semantic knowledge. In addition, the network model may be used to evaluate results. Information may be filtered according to inferences as to the relative accuracy of the various information appliances that were queried. For example, a telephone number that has been matched with a voice-mail caller ID record might be considered more reliable than an information item consisting of a document containing a list of telephone numbers.

In many instances, query results may be redundant. The same information may be returned from a number of different information appliances or other sources. In order to avoid presenting the same information repeatedly to the end user, in one embodiment the present invention seeks to combine received results and eliminate redundancy. Estimated relevance of a newly received information item may thus be adjusted, in part, based on a history of information items previously received by the same user regarding the same subject.

In one embodiment, a Bayesian belief net is implemented, incorporating information from various sources and assigning relevance. Relevance thresholds are established to indicate when an information item should be retained, deleted, saved, displayed, or prioritized in a certain way.

Figure 7:
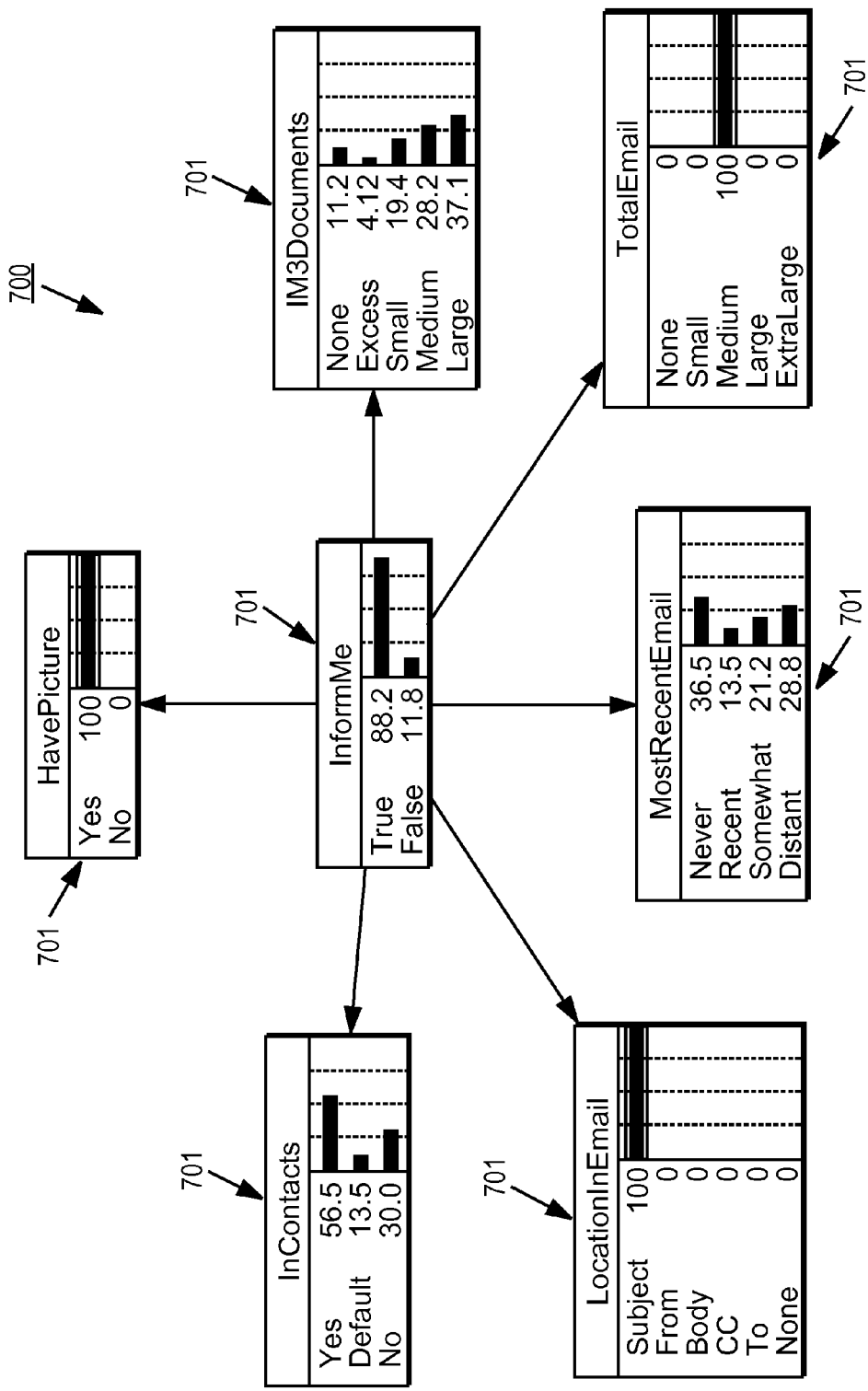
FIG. 7 is an example of a Bayesian belief net for determining relevance according to the present invention.

As is well known in the art, a Bayesian belief net is a directed graph, consisting of a number of connected nodes and associated with a set of probability tables. Nodes represent variables (such as relevance indicators), and connections among nodes represent relationships among variables. Referring now to FIG. 7, there is shown an example of a Bayesian belief net 700 for determining relevance according to the present invention. Relevance indicators, shown in various probability tables 701, can be combined based on traversal of the belief net, in order to determine the relevance of various information items.

The invention may also take into account the history of the user's interaction with particular data items in determining which information to present. The invention may use software such as Netica by Norsys Software Corporation of vention may use software such as Netica by Norsys Software Corporation of Vancouver, British Columbia, Canada, to implement such a Bayesian belief net.

Information appliances 804, in one embodiment, provide additional knowledge, such as context, physical location, user data, limitations, recency of the data, amount of the data, and the like. Such knowledge may be collected at query/result time, or at a time specified by the user, or on a periodic basis. It may be stored in a cache or in a database. In one embodiment, the relevance engine 806 of the present invention incorporates such additional knowledge in evaluating the relevance and value of query results from particular information appliances 804. By incorporating such additional knowledge, relevance engine 806 is able to more accurately estimate likely relevance of particular results and thereby provide more useful information to the end user. In one embodiment, the additional knowledge is incorporated by adjusting the values of certain nodes in the belief net in response to the additional knowledge, and recalculating the values of other nodes when affected.

Queries and Query Results

In one embodiment, information appliances 804 are configured to receive and respond to queries according to the context and information stored therein. As described above, queries and query results may be transmitted across network 805 using an e-mail protocol, so as to facilitate asynchronous operation and to permit access to information appliances 804 located behind a firewall. Accordingly, in one embodiment, information appliances 804 are configured to respond to queries received via e-mail. For example, information appliances 804 may be configured to run Perl scripts, Visual Basic for Applications (VBA) scripts, and the like, when queries are received, in order to perform searches according to received parameters and transmit results back to the querying machine. Similarly, in embodiments that enable querying of other users' computers, the e-mail applications on those computers may be configured to scan incoming e-mails for scripts containing queries; if such query scripts are detected, they are executed and the results are transmitted back via e-mail.

In one embodiment, e-mail queries are encoded using Extended Markup Language (XML) tags to indicate various fields and terms. Information appliances 804 are configured to parse the XML tags and respond to the query appropriately. The use of XML tags facilitates structured queries, whereby keywords can be associated with specific fields; thus, information appliances 804 can select particular resources, records, and fields to be searched based on the tag information. For example, an XML tag indicating that the search term is a ZIP code might indicate that a geographic resource be searched, while an XML tag indicating that the search term is a URL might indicate that a World Wide Web directory be searched. Query results may also be transmitted via XML-encoded e-mail; the XML tags identify the various fields in the result items so that they can be parsed and identified by relevance engine 806.

An example of an XML-encoded e-mail query excerpt according to one embodiment is as follows:

```
<unconscious-retrieval>
<item id="226" type="contact">
<e-mail>derek@rsv.ricoh.com</e-mail>
<name>Derek Poppink></name>
<ZIP>94040</ZIP>
<target_user>hull</target_user>
</item>
<item id="3" type="contact">
<name>Jamey</name>
<first_name>Jamey</first_name>
<last_name>Graham</last_name>
<city>Tokyo</city>
<target_user>hull</target_user>
</item>
</unconscious-retrieval>
```

An example of an XML-encoded e-mail result excerpt according to one embodiment is as follows:

```
<unconscious-retrieval>
<item id="226" type="contact">
<name>Derek Poppink></name>
<im3_document>
<url>http://salmon.crc.ricoh.com:8001/hull/1999/8/11461/11461.html</url>
<doc_source>guestbook</doc_source>
<capture_date>Fri Aug 6 09:41:00 1999</capture_date>
<num_pages></num_pages>
<num_words>5</num_words>
<score>1389</score>
</im3_document>
</item>
</unconscious-retrieval>
```

As can be seen in the above excerpt, the query result contains a URL pointing to additional information, an identifier as to the source of the result data, the date the data was captured, an overall score indicating likely relevance of the query result, and statistics regarding the query result. Each of these data elements are identified by an XML tag so that it can be parsed out and processed accordingly.

In one embodiment, information is collected from information appliances 804 on a periodic basis, and stored in an aggregated fashion in a database (not shown). Unconscious retrieval engine 808 can thereby retrieve desired information from the stored database without having to query each individual information appliance 804 separately.

In one embodiment, the user can also specify conscious queries. The mechanisms described above in connection with unconscious queries, multi-stage queries, result evaluation, and the like, may be applied to conscious queries in a similar manner and with similar results.

Network 805

In one embodiment, the present invention operates in a network 805 of information appliances 804. The configuration and topology of the network may be used to infer relationships among network nodes and among the information the nodes contain. More effective searches may thereby be performed, and the overall effectiveness of the unconscious retrieval scheme may be improved.

One skilled in the art will recognize that the present invention may be used in connection with any network configuration. In environments where a central repository of information is available, all queries might be directed to one information source. In environments were information is distributed among many nodes of the network, a peer-to-peer methodology may be more appropriate, with relationships among peers being used to determine which nodes to query for particular information searches.

Figure 6:
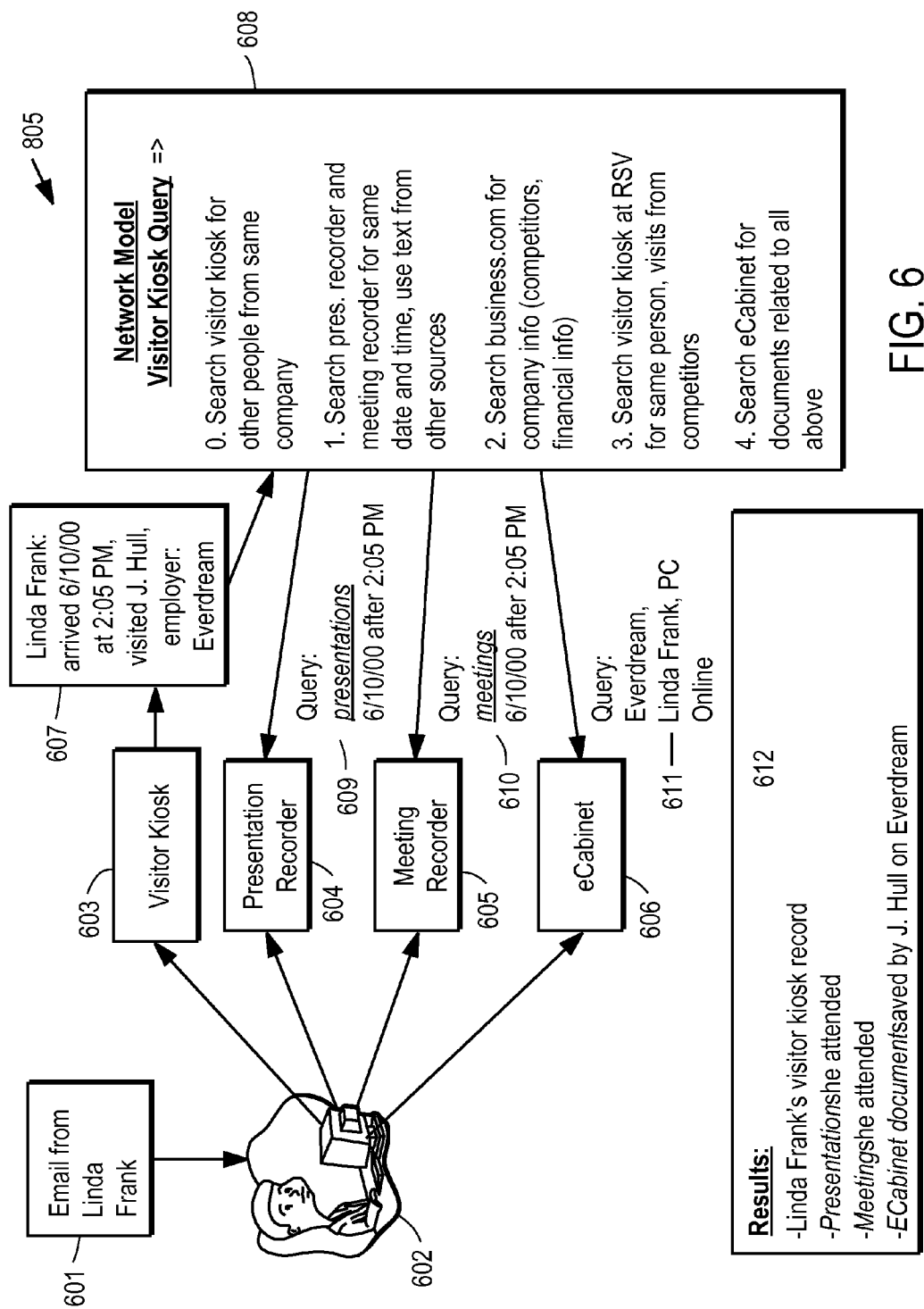
FIG. 6 is an example of a network of information appliances according to one embodiment of the present invention.

Referring now to FIG. 6, there is shown an example of a network 805 of information appliances according to one embodiment of the present invention. E-mail 601 is received from Linda Frank at user's computer 602. The invention consults network model 608 to direct the formulation and execution of queries 609-611 to various information appliances 603-606. Data 607 from some of information appliances 603 may be used by network model 608 in formulating queries 609-611 for other information appliances 604-606. Results 612 are obtained from information appliances 603-606 and presented to the user at computer 602, in the manner described above.

In addition to obtaining information from information appliances 804, the present invention may also obtain information from other users' computers. In particular, where a number of users' computers are interconnected, for example on a company-wide network, the present invention provides a mechanism for accessing relevant information which has been shared by other users. For example, contact information stored in one person's computer might be made available to other users within the company; unconscious sharing and retrieval of such information is a particularly efficient way to distribute the data among users and to ensure that all users are up to date. In one embodiment, each user can control the extent to which data on his or her computer is shared, and the extent to which his or her computer responds to queries received in connection with the present invention. In another embodiment, such policies may be established centrally by the company or organization.

Where shared information is available, the present invention is particularly useful because end users may not be aware of the existence of relevant shared information; thus the unconscious retrieval methods of the present invention may present information to the end user that is highly relevant, the existence of which the user was unaware. Rules and permissions may be established and maintained by holders of the information, or by the company providing the network, or by some other agency, so as to ensure that work, or by some other agency, so as to ensure that access to shared information takes place in an appropriate and authorized manner.

Information Appliances 804 and Other Data Sources

As described above, the present invention may be implemented in a network of information appliances 804 and other data sources. For illustrative purposes, the following is a list of exemplary information appliances 804 and other data sources for responding to queries according to the present invention.

Visitor Kiosk: Captures multimedia data about visitors. May be located in the lobby of an office, hotel, conference center, and the like. Stores visitor data (pictures, business card image, contact info, audio recordings, biometric data, visit history, hosts, visit purpose, visit agenda, location entered) and employee data (pictures, contact info, business card image, audio recordings, biometric data).

Meeting Recorder: Records and archives meetings. May be portable, carried from room to room. Stores video, audio, identities of meeting participants, text transcript, meeting date/time, keyframes, keywords, location of meeting.

Presentation Recorder: Records and archives presentations. May be attached to large-screen display or projector. Stores keyframes, audio recording, identities of speakers, optical character recognition (OCR) results, presentation date/time, keywords, location of presentation, text transcript.

Whiteboard Capture Appliance: Records activity at whiteboard or blackboard. May be located in a conference room or portable whiteboard. Stores session information, whiteboard images, audio recordings, identities of speakers, identities of writers, OCR results, handwriting recognition data, keywords, stroke order, capture date/time, location of whiteboard, text transcript of recording.

Phone/Voicemail Appliance: Routes local calls, saves voice-mail digitally. May be located in an office server room, or attached to phones. Stores voice-mail data, including speaker recognition, caller ID, call date/time, transcript of call. Also stores call data, including speaker recognition, caller ID, call date/time, transcript of call. Also stores local phone numbers, names.

Document Management Devices (a.k.a. Infinite Memory Multifunction Machine, eCabinet): Automatically captures digital copies of documents. May be attached to network or individual devices (printers, copiers, fax machines). Stores documents (fax, print, copy, scan, e-mail), captures date/time, source, keywords, OCR results, title, author, useful words (names, URLs, dates), folders, creation date/time, modified date/time, access list. Such devices are available, for example, from Ricoh Silicon Valley, Inc., of Menlo Park, Calif.

Lotus Databases: Communication and document groupware.

Stores documents (minutes, announcements, contacts, presentations, html pages, forms, messages), including author, title, creation date/time, modified date/time, modification history, URL, access list, read/unread status, keywords, file type.

World Wide Web: Information browsing and searching. Includes information (news, sports, weather, patents, company info, discussion groups, chat rooms, products, stores, digital libraries, schools, webcasts) and meta-data such as URL, size, contents, update history, keywords, cookies, bookmarks, browsing history.

Other computers: Usually individual work. Typically includes documents (spreadsheets, multimedia, presentations, reports, help files, and the like) and meta-data such as creation date/time, modified date/time, application, size, file location, keywords.

Environments and Applications

For illustrative purposes, the following are examples of environments and applications in which the techniques of the present invention may be applicable. In each example, the present invention can be implemented either as a bundled feature of the application, or as a plug-in. The following list is not intended to be exhaustive, nor is it intended to restrict the scope of the invention in any way.

Productivity Software such as Microsoft Outlook, Eudora, Netscape Communicator, and Palm Desktop: These programs typically include various integrated components, including e-mail messaging, calendar, contact lists, memos, tasks, journals, and the like. Useful information may be scattered among these various components, in various forms, and on different users' machines as well as on a central server. The unconscious retrieval techniques of the present invention can formulate queries to retrieve relevant data from these various information sources. When messages are received or viewed, information about the sender and/ or query keys extracted from message content is automatically retrieved. Results may be ranked according to relative prominence of the query key in the primary document (e.g. sender information may be considered more important than information concerning a recipient of a cc of the message), and presentation to the user may vary according to the ranking. The interface may include user controls for setting thresholds and retrieval and display preferences.

Examples of context provided by e-mail components include from, to, cc, subject, body, attachments, date, time, read/unread, priority, and threads. They may request information about, for example, people and topics. In response to requests, such components may provide interaction histories concerning, for example, people, topics, and the like.

Examples of context provided by calendar components include name, phone, e-mail, fax, web, address, company, and category. They may request information about, for example, dates, times, and topics. In response to requests, such components may provide information about, for example, dates, times, and topics.

Examples of context provided by task and memo components include keywords, categories, deadlines, and creation times. They may request information about, for example, topics. In response to requests, such components may provide information about, for example, topics.

Contact managers and address books: Contact managers and address books may form part of office applications, or may be stand-alone applications. A central directory may be maintained, and/or individual directories may be stored on users' computers or personal digital assistants (PDAs). User machines may keep track of all entries in the central directory, and a user may edit records and move records from local storage to the central directory, or vice versa, at will. Directories may contain various types of information concerning individuals, including pictures, recordings, contact information, website URLs, notes, company information, interests, and the like. In accordance with the unconscious retrieval techniques described herein, updates to a contact record can be automatically propagated among the various directories, so that all directories are kept up to date. In addition, in one embodiment, the invention tracks interaction history with individuals listed in the directories, so that such information can be used in formulating queries and retrieving results.

Examples of context provided by contact managers and address books include name, phone, e-mail, fax, web, address, company, and category. They may request information about, for example, people, places, and companies. In response to requests, such components may provide information concerning, for example, people.

Web Browsers: Examples of context provided by web browsers include browser history, bookmarks, and contents of pages. They may request information about, for example, topics and URLs. In response to requests, browsers may provide information concerning, for example, topics, dates, URLs, and times.

Collaboration products such as Lotus Notes: Such programs often include collaborative workspaces and databases that can contain a wide variety of information collected from multiple users. The unconscious retrieval techniques of the present invention can formulate queries for scanning these workspaces and retrieving relevant information for end users.

Productivity applications, such as word processors and spreadsheet programs. Examples of context provided by such applications include author, keywords, inserted multimedia, structure, creation date/time, history, and versions. They may request information about, for example, topics and multimedia. In response to requests, such applications may provide information concerning, for example, topics.

Visitor kiosks: Kiosks can be used to collect information regarding visitors, such as when a visitor sign-in application is used. Information can include the person's name, company, time of visit, picture (if a digital camera is installed), fingerprint or other biometric data (if appropriate scanners are available), and the like. Collected information can then be provided to end users via the unconscious retrieval techniques described above. Visitor kiosks can also be used to distribute information that may be of interest to a visitor, for example by unconsciously retrieving information from a contact database concerning the person being visited. In addition, the unconscious retrieval techniques of the present invention may be used to notify other interested parties about the visit. Such notification can be made via any known communication technique, including for example e-mail or telephone, and may take place either asynchronously or in real time.

Examples of context provided by kiosks include picture, contact info, audio, date/time, host, purpose, agenda, and location. They may request information about, for example, information about people, places, topics, dates, and times. In response to requests, kiosks may provide information concerning, for example, people, dates, times, and topics.

Meeting recorders: Examples of context provided by meeting recorders include participants, keywords, transcript, video, audio, room, and date/time. They may request information about, for example, people, dates, times, rooms, and topics. In response to requests, meeting recorders may provide information concerning, for example, people, dates, times, and topics.

Presentation recorders: Examples of context provided by presentation recorders include participants, keywords, transcript, keyframes, audio, OCR, and date/time. They may request information about, for example, people, dates, times, rooms, and topics. In response to requests, presentation dates, times, rooms, and topics. In response to requests, presentation recorders may provide information concerning, for example, people, dates, times, and topics.

Whiteboard capture devices: Examples of context provided by whiteboard capture devices include users, keywords, audio, and date/time. They may request information about, for example, people, dates, times, rooms, and topics. In response to requests, whiteboard capture devices may provide information concerning, for example, people, dates, times, and topics.

Communication applications and devices, such as fax machines, voice-mail systems, instant messenger programs, and cell phones. Examples of context provided by such systems include caller ID, date/time, callee, transcript, and date/time. They may request information about, for example, people, phone numbers, dates, times, and topics. In response to requests, such systems may provide information concerning, for example, people, dates, times, and topics.

Document management devices: Examples of context provided by document management devices include OCR results, date/time, source, author, title, and type of document. They may request information about, for example, people, dates, times, and topics. In response to requests, document management devices may provide information concerning, for example, people, dates, times, and topics.

Portable computing devices, such as laptops and personal digital assistants (PDAs): Mobile users often have a need for information while traveling or otherwise unconnected to a network. Particular information needs may be unanticipated by the user, and such information may not be available to the user while unconnected. The unconscious retrieval techniques of the present invention can be used to collect information while the device is connected to a network, and store the information locally on the device so that it can be presented to the user at a later time, even when the device is unconnected. The invention thus takes advantage of otherwise unused memory on the device, and in effect pre-fetches documents and data that are likely to be of use to the user when unconnected to a network. In one embodiment, location information, such as may be determined from a global positioning system (GPS) module in the portable device, may be used in formulating queries; for example, based on GPS data, the invention may automatically retrieve information about customers within a five-mile radius of the user's location.

Active Directory: One application of the present invention is to use the unconscious information retrieval techniques in the context of a network of shared information appliances to build and access a dynamic directory of information about people. The dynamic directory could be accessed by users in order to obtain more information about an individual, for example when the individual is encountered or about to be encountered. Such information may be obtained in the context of any type of encounter with the individual, including for example personal contact (face-to-face meetings or telephone calls), contact via some medium such as voice-mail, e-mail or documents, or contact through a third party. The information may be desired for background purposes, or to prepare questions or to provide subject matter for small talk.

Unconscious retrieval, as described above, can be used to determine whether information about the individual is available, to obtain the information from information appliances or other devices, to evaluate the results, and then to present the information to the end user. Thus, for example, an implementation as described above might scan incoming e-mail messages for proper names, look up the recognized names in a company directory, and present the results to the end user in a hyperlinked format that provides access to personal home pages or other information concerning the named individuals.

As can be seen from the above examples, the present invention provides unconscious retrieval, evaluation, and presentation of useful information relevant to a user's tasks. The invention is thus able to provide information that was previously not known to exist by the user, and avoids the limitations of information overload, source overload, and overhead described above. As will be understood by those familiar with the art, the invention may be embodied in other specific forms without departing from the spirit or essential characteristics thereof. For example, the particular architectures depicted above are merely exemplary of one implementation of the present invention. The functional elements and method steps described above are provided as illustrative examples of one technique for implementing the invention; one skilled in the art will recognize that many other implementations are possible without departing from the present invention as recited in the claims. Likewise, the particular capitalization or naming of the modules, protocols, features, attributes, or any other aspect is not mandatory or significant, and the mechanisms that implement the invention or its features may have different names or formats. Accordingly, the disclosure of the present invention is intended to be illustrative, but not limiting, of the scope of the invention, which is set forth in the following claims.

What is claimed is:

1. A computer-implemented method for unconscious data retrieval, comprising:
   extracting at least one query key from a primary document;
   responsive to a connection with at least one data source being available, pre-fetching at least one query result by:
      querying the at least one data source with the at least one query key; and
      receiving at least one query result from at least one data source;
   evaluating the received at least one query result;
   accessing the primary document; and
   displaying at least one received query result;
      wherein extracting, querying, receiving, and evaluating are performed automated asynchronously with respect to user interaction with the primary document; and
      wherein displaying the at least one received query result is performed without regard to whether a connection with a data source is available and in response to accessing the primary document.

2. The method of claim 1, further comprising, prior to extracting:
   receiving the primary document;
   and wherein extracting, querying, receiving, and evaluating are performed in response to receiving the primary document.

3. The method of claim 1, further comprising, prior to displaying at least one received query result:
   displaying the primary document;
   and wherein displaying at least one received query result is performed in response to displaying the primary document.

4. The method of claim 1, wherein the primary document comprises an electronic communication.

5. The method of claim 4, wherein the primary document comprises an e-mail message.

6. The method of claim 4, further comprising, prior to extracting:
   receiving the electronic communication;
   and wherein extracting, querying, receiving, and evaluating are performed in response to receiving the electronic communication.

7. The method of claim 6, wherein receiving the electronic communication comprises receiving the electronic communication at an e-mail server.

8. The method of claim 6, wherein receiving the electronic communication comprises receiving the electronic communication at a user's computer.

9. The method of claim 6, wherein receiving the electronic communication comprises retrieving the electronic communication from an e-mail server to a user's computer.

10. The method of claim 1, further comprising:
storing the evaluated at least one query result;
and wherein displaying at least one received query result comprises:
retrieving the stored at least one query result; and
displaying the retrieved at least one query result.

11. The method of claim 1, wherein querying at least one data source comprises:
transmitting a query over a network.

12. The method of claim 1, wherein querying at least one data source comprises transmitting an e-mail message containing a query to the at least one data source.

13. The method of claim 1, wherein querying at least one data source comprises transmitting across a firewall an e-mail message containing a query to the at least one data source.

14. The method of claim 1, wherein querying at least one data source comprises transmitting an XML-encoded e-mail message containing a query to the at least one data source.

15. The method of claim 1, wherein receiving at least one query result from at least one data source comprises receiving an e-mail message containing at least one query result from at least one data source.

16. The method of claim 1, wherein receiving at least one query result from at least one data source comprises receiving an XML-encoded e-mail message containing at least one query result from at least one data source.

17. The method of claim 1, wherein the at least one data source comprises:
at least one information appliance.

18. The method of claim 17, wherein at least one of the information appliances comprises one selected from the group consisting of:
a visitor kiosk;
a meeting recorder;
a presentation recorder;
a whiteboard capture device;
a communication device; and
a document management device.

19. The method of claim, 1, wherein evaluating the received at least one query result comprises estimating the relevance of the query result with respect to the electronic communication.

20. The method of claim 1, wherein evaluating the received at least one query result comprises determining whether the query result has previously been displayed.

21. The method of claim 1, wherein evaluating the received at least one query result comprises determining whether the query result is sufficiently relevant with respect to a predetermined relevancy threshold;
and wherein displaying at least one received query result comprises displaying a query result responsive to the determination indicating that the query result is sufficiently relevant.

22. The method of claim 1, wherein displaying at least one received query result comprises determining displaying at least one received query result in a sequence prioritized according to estimated relevance.

23. The method of claim 1, wherein displaying at least one received query result comprises displaying the query result in the context of a currently active software application.

24. The method of claim 1, wherein displaying at least one received query result comprises displaying the query result in a sidebar pane adjacent to a currently active on-screen window.

25. The method of claim 1, wherein displaying at least one received query result comprises displaying the query result in an on-screen window concurrently with display of a currently active on-screen window.

26. The method of claim 1, wherein displaying at least one received query result comprises displaying the query result in an on-screen dialog box.

27. The method of claim 1, wherein at least a portion of the displayed query result comprises a hyperlink to a resource containing data related to the displayed query result.

28. The method of claim 1, wherein the at least one received query result comprises a plurality of query results, the method further comprising:
prioritizing the query results according to estimated relevance;
and wherein displaying at least one received query result comprises displaying a plurality of query results in order of priority.

29. The method of claim 28, wherein prioritizing the query results is performed responsive to the context of the query results.

30. The method of claim 28, wherein prioritizing the query results is performed responsive to the context of the query key in the primary document.

31. The method of claim 1, wherein at least one of the data sources comprises a network-connected computer containing shared information.

32. The method of claim 1, wherein at least one of the data sources comprises a shared directory.

33. The method of claim 1, wherein at least one of the data sources is intermittently connected via a network.

34. The method of claim 1, wherein the primary document is one selected from the group consisting of:
an electronic communication;
a word processing document;
a spreadsheet document;
a task item;
a calendar item;
a file;
an image;
a sound recording;
a video recording; and
a contact record.

35. The method of claim 1, wherein querying at least one data source comprises:
formulating a structured query based on the extracted at least one query key; and
transmitting the structured query to the at least one data source.

36. The method of claim 1, wherein extracting at least one query key comprises applying a part-of-speech analysis to the primary document.

37. The method of claim 1, further comprising:
selecting at least one data source based on the extracted at least one query key;
and wherein querying at least one data source comprises querying the selected at least one data source.

38. The method of claim 1, wherein evaluating the received at least one query result comprises applying a Bayesian belief net to determine estimated relevance of the at least one query result.

39. The method of claim 1, wherein displaying at least one received query result comprises displaying the result on a device that is intermittently connected via a network.

40. The method of claim 39, wherein the device comprises a portable computing device.

41. The method of claim 1, wherein the primary document comprises a text document.

42. The method of claim 1, wherein the primary document comprises a non-text document.

43. The method of claim 1, wherein querying at least one data source comprises transmitting a text query.

44. The method of claim 1, wherein querying at least one data source comprises transmitting a non-text query.

45. The method of claim 1, wherein
displaying at least one received query result comprises displaying the query result in a calendar display.

46. The method of claim 1, wherein displaying at least one received query result comprises:
designating at least a portion of the primary document as a hyperlink; and
responsive to user activation of the hyperlink, displaying a query result.

47. The method of claim 1, wherein displaying at least one received query result comprises:
displaying an on-screen button; and
responsive to user activation of the button, displaying a query result.

48. The method of claim 1, wherein displaying at least one received query result comprises:
displaying a toolbar menu activation button; and
responsive to user activation of the button, displaying a query result.

49. The method of claim 1, wherein displaying at least one received query result comprises:
displaying a menu comprising at least one command; and
responsive to user selection of one of the at least one command, displaying a query result.

50. The method of claim 1, wherein displaying at least one received query result comprises:
displaying a menu activation icon;
responsive to user activation of the menu activation icon, displaying a menu comprising at least one command; and
responsive to user selection of one of the at least one command, displaying a query result.

51. A computer-implemented system for unconscious data retrieval, comprising:
a receiver, for receiving a primary document;
a requester, coupled to the receiver, for, responsive to a connection with at least one data source being available, pre-fetching at least one query result by generating and transmitting to at least one data source at least one query related to the primary document;
an evaluator, for receiving at least one query result from the at least one data source and for evaluating the received at least one query result; and
a display, coupled to the evaluator, for displaying the at least one received query result without regard to whether a connection with a data source is available;
wherein the receiver, the requester, and the evaluator operate automated asynchronously with respect to user interaction with the primary document.

52. The system of claim 51, wherein the primary document comprises an electronic communication.

53. The system of claim 52, wherein the primary document comprises an e-mail message.

54. The system of claim 53, wherein the receiver comprises an e-mail server.

55. The system of claim 53, wherein the receiver comprises an e-mail program running on a user's computer.

56. The system of claim 51, further comprising:
a storage device, coupled to the evaluator, for storing the evaluated at least one query result;
and wherein the display displays at least one received query result retrieved from the storage device.

57. The system of claim 51, wherein the requester transmits the query over a network.

58. The system of claim 57, wherein the requester transmits an e-mail message containing the query to the at least one data source.

59. The system of claim 57, wherein the requester transmits across a firewall an e-mail message containing the query to the at least one data source.

60. The system of claim 57, wherein the evaluator receives an e-mail message containing at least one query result from at least one data source.

61. The system of claim 51, wherein the evaluator estimates the relevance of the query result with respect to the primary document.

62. The system of claim 51, wherein the evaluator determines whether the query result is sufficiently relevant with respect to a predetermined relevancy threshold;
and wherein the display displays a query result responsive to the determination indicating that the query result is sufficiently relevant.

63. The system of claim 51, wherein the display displays at least one received query result in a sequence prioritized according to estimated relevance.

64. The system of claim 51, wherein the display displays the query result in the context of a currently active software application.

65. The system of claim 51, wherein the display comprises a sidebar pane adjacent to a currently active on-screen window.

66. The system of claim 51, wherein the display comprises an on-screen window shown concurrently with a currently active on-screen window.

67. The system of claim 51, wherein the display comprises an on-screen dialog box.

68. The system of claim 51, wherein at least a portion of the displayed query result comprises a hyperlink to a resource containing data related to the displayed query result.

69. The system of claim 51, wherein at least one of the data sources comprises a network-connected computer containing shared information.

70. The system of claim 51, wherein at least one of the data sources comprises a shared directory.

71. The system of claim 51, wherein at least one of the data sources is intermittently connected via a network.

72. The system of claim 51, wherein the primary document is one selected from the group consisting of:
an electronic communication;
a word processing document;
a spreadsheet document;
a task item;
a calendar item;
a file;
an image;
a sound recording;
a video recording; and
a contact record.

73. The system of claim 51, wherein the requester comprises:
a query formulator, for formulating a structured query based on the extracted at least one query key; and
a transmitter, coupled to the query formulator, for transmitting the structured query to the at least one data source.

74. The system of claim 51, wherein the evaluator applies a Bayesian belief net to determine estimated relevance of the at least one query result.

75. The system of claim 51, wherein the display comprises a portable computing device.

76. The system of claim 51, wherein the primary document comprises a text document.

77. The system of claim 51, wherein the primary document comprises a non-text document.

78. The system of claim 51, wherein the display comprises a calendar display.

79. The system of claim 51, wherein the display comprises a user-activated toolbar menu.

80. A computer program product comprising a computer-usable medium having computer-readable code embodied therein for unconscious data retrieval, comprising:
   computer-readable program code configured to cause a computer to extract at least one query key from a primary document;
   computer-readable program code configured to cause a computer to, responsive to a connection with at least one data source being available, pre-fetching at least one query result by:
      querying at least one data source with the at least one query key; and
      receiving at least one query result from at least one data source;
   computer-readable program code configured to cause a computer to evaluate the received at least one query result;
   computer-readable program code configured to cause a computer to access the primary document; and
   computer-readable program code configured to cause a computer to display at least one received query result;
   wherein the computer-readable program code configured to cause a computer to extract, query, receive, and evaluate operate automated asynchronously with respect to user interaction with the primary document;
   and wherein the computer-readable program code configured to cause a computer to display the at least one received query result operates without regard to whether a connection with a data source is available and in response to accessing the primary document.

81. The computer program product of claim 80, wherein the computer-readable program code configured to cause a computer to extract, query, receive, and evaluate operate asynchronously with respect to user interaction with the primary document.

82. The computer program product of claim 80, further comprising: computer-readable program code configured to cause a computer to store the evaluated at least one query result;
   and wherein the computer-readable program code configured to cause a computer to display at least one received query result comprises:
computer-readable program code configured to cause a computer to retrieve the stored at least one query result; and
computer-readable program code configured to cause a computer to display the retrieved at least one query result.

83. The computer program product of claim 80, wherein the computer-readable program code configured to cause a computer to evaluate the received at least one query result comprises computer-readable program code configured to cause a computer to estimate the relevance of the query result with respect to the primary document.

84. The computer program product of claim 80, wherein the computer-readable program code configured to cause a computer to evaluate the received at least one query result comprises computer-readable program code configured to cause a computer to determine whether the query result is sufficiently relevant with respect to a predetermined relevancy threshold;
   and wherein the computer-readable program code configured to cause a computer to display at least one received query result comprises computer-readable program code configured to cause a computer to display a query result responsive to the determination indicating that the query result is sufficiently relevant.

85. The computer program product of claim 80, wherein the computer-readable program code configured to cause a computer to display at least one received query result comprises computer-readable program code configured to cause a computer to display the query result in the context of a currently active software application.

86. The computer program product of claim 80, wherein the computer-readable program code configured to cause a computer to display at least one received query result comprises computer-readable program code configured to cause a computer to display the query result in a sidebar pane adjacent to a currently active on-screen window.

87. The computer program product of claim 80, wherein the computer-readable program code configured to cause a computer to display at least one received query result comprises computer-readable program code configured to cause a computer to display the query result in an on-screen window concurrently with display of a currently active on-screen window.

88. The computer program product of claim 80, wherein the computer-readable program code configured to cause a computer to display at least one received query result comprises computer-readable program code configured to cause a computer to display the query result in an on-screen dialog box.

89. The computer program product of claim 80, wherein at least one of the data sources comprises a network-connected computer containing shared information.

90. The computer program product of claim 80, wherein at least one of the data sources comprises a shared directory.

91. The computer program product of claim 80, wherein the primary document is one selected from the group consisting of:
   an electronic communication;
   a word processing document;
   a spreadsheet document;
   a task item;
   a calendar item;
   a file;
   an image;
   a sound recording;
   a video recording; and
   a contact record.

92. The computer program product of claim 80, wherein the computer-readable program code configured to cause a computer to query at least one data source comprises:
   computer-readable program code configured to cause a computer to formulate a structured query based on the extracted at least one query key; and
   computer-readable program code configured to cause a computer to transmit the structured query to the at least one data source.

93. The computer program product of claim 80, wherein the computer-readable program code configured to cause a computer to extract at least one query key comprises computer-readable program code configured to cause a computer to apply a part-of-speech analysis to the primary document.

94. The computer program product of claim 80, wherein the computer-readable program code configured to cause a computer to evaluate the received at least one query result comprises computer-readable program code configured to cause a computer to apply a Bayesian belief net to determine estimated relevance of the at least one query result.

95. The computer program product of claim 80, wherein the computer-readable program code configured to cause a computer to display at least one received query result comprises computer-readable program code configured to cause a computer to display the result on a device that is intermittently connected via a network.

96. The computer program product of claim 80, wherein the computer-readable program code configured to cause a computer to display at least one received query result comprises:
   computer-readable program code configured to cause a computer to designate at least a portion of the primary document as a hyperlink; and
   computer-readable program code configured to cause a computer to, responsive to user activation of the hyperlink, display a query result.

97. The computer program product of claim 80, wherein the computer-readable program code configured to cause a computer to display at least one received query result comprises:
   computer-readable program code configured to cause a computer to display an on-screen button; and
   computer-readable program code configured to cause a computer to, responsive to user activation of the button, display a query result.

98. The computer program product of claim 80, wherein the computer-readable program code configured to cause a computer to display at least one received query result comprises:
   computer-readable program code configured to cause a computer to display a toolbar menu activation button; and
   computer-readable program code configured to cause a computer to, responsive to user activation of the button, display a query result.

99. The computer program product of claim 80, wherein the computer-readable program code configured to cause a computer to display at least one received query result comprises:
   computer-readable program code configured to cause a computer to display a menu comprising at least one command; and
   computer-readable program code configured to cause a computer to, responsive to user selection of one of the at least one command, display a query result.

100. The computer program product of claim 80, wherein the computer-readable program code configured to cause a computer to display at least one received query result comprises:
   computer-readable program code configured to cause a computer to display a menu activation icon;
   computer-readable program code configured to cause a computer to, responsive to user activation of the menu activation icon, display a menu comprising at least one command; and
   computer-readable program code configured to cause a computer to, responsive to user selection of one of the at least one command, display a query result.

* * * * *